US012691955B2

(12) United States Patent
Hargas et al.

(10) Patent No.: US 12,691,955 B2
(45) Date of Patent: Jul. 28, 2026

(54) VEHICLE WITH IMPACT-MITIGATING CAB

(71) Applicant: Oshkosh Corporation, Oshkosh, WI (US)

(72) Inventors: Matt Hargas, Oshkosh, WI (US); Greg Steffens, Oshkosh, WI (US); Mitchell Murphy, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 349 days.

(21) Appl. No.: 18/443,643

(22) Filed: Feb. 16, 2024

(65) Prior Publication Data

US 2024/0278858 A1 Aug. 22, 2024

Related U.S. Application Data

(60) Provisional application No. 63/485,767, filed on Feb. 17, 2023.

(51) Int. Cl.
B62D 33/06 (2006.01)
B62D 21/02 (2006.01)
(Continued)

(52) U.S. Cl.
CPC .............. B62D 33/06 (2013.01); B62D 21/02 (2013.01); B62D 21/155 (2013.01); B62D 24/00 (2013.01);
(Continued)

(58) Field of Classification Search
CPC .. B62D 33/06; B62D 33/063; B62D 33/0636; B62D 33/067; B62D 33/077;
(Continued)

(56) References Cited

U.S. PATENT DOCUMENTS 6,105,698 A * 8/2000 Tsuyama ................ B62D 33/06
180/232
2004/0032149 A1* 2/2004 Ljungquist ............. B62D 33/06
296/187.03
(Continued)

FOREIGN PATENT DOCUMENTS

CN 115503834 A * 12/2022 ............. B62D 25/20
DE 3733876 A1 * 10/1988 ........... B60N 2/4214
(Continued)

OTHER PUBLICATIONS https://info.macktrucks.com/refuse-revolution; "Welcome to the refuse revolution. Mack LR Electric." Retrieved on Mar. 21, 2023.
(Continued)

*Primary Examiner* — Keith J Frisby
(74) *Attorney, Agent, or Firm* — Foley & Lardner LLP

(57) ABSTRACT

A refuse vehicle includes a chassis having a frame member, a front axle assembly, and a rear axle assembly. The refuse vehicle also includes a mount coupled to the frame member and extending from a front portion of the frame member, the mount having a receiver extending laterally along the mount, and a cab movably coupled to the frame member and the mount. The cab includes a cab frame member, a cab cross-member coupled to the cab frame member and extending laterally from the cab frame member, and a brace coupled to the cab frame member. The cab cross-member is coupled to the cab frame member forward relative to the receiver, where in response to a force being applied to a front end of the cab, the cab is configured to move rearward relative to the mount and the cab cross-member is configured to engage the receiver.

20 Claims, 17 Drawing Sheets

(51) Int. Cl.

| | |
|---|---|
| *B62D 21/15* | (2006.01) |
| *B62D 21/18* | (2006.01) |
| *B62D 24/00* | (2006.01) |
| *B62D 25/08* | (2006.01) |
| *B62D 25/18* | (2006.01) |
| *B62D 25/20* | (2006.01) |
| *B62D 33/063* | (2006.01) |
| *B62D 33/067* | (2006.01) |
| *B62D 33/077* | (2006.01) |
| *B65F 3/00* | (2006.01) |
| *B65F 3/02* | (2006.01) |

(52) U.S. Cl.
CPC ............ *B62D 25/08* (2013.01); *B62D 25/18* (2013.01); *B62D 25/20* (2013.01); *B62D 25/2018* (2013.01); *B62D 33/063* (2013.01); *B62D 33/0636* (2013.01); *B62D 33/067* (2013.01); *B62D 33/077* (2013.01); *B65F 3/00* (2013.01); *B65F 3/02* (2013.01); *B60Y 2200/144* (2013.01); *B65F 2003/0269* (2013.01); *B65F 2003/0279* (2013.01)

(58) Field of Classification Search
CPC ...... B62D 24/00; B62D 21/15; B62D 21/152; B62D 21/155; B62D 21/02; B62D 21/18; B62D 25/08; B62D 25/081; B62D 25/20; B62D 25/2009; B62D 25/2018; B65F 3/00; B65F 3/02; B65F 2003/0269; B65F 2003/0279; B60Y 2200/144
USPC ....... 180/311, 327, 328, 89.12, 89.13, 89.14, 180/89.15; 296/187.09, 187.03, 187.1, 296/190.01, 190.04, 190.05, 190.08
See application file for complete search history.

(56) References Cited

U.S. PATENT DOCUMENTS

| | | | | |
|---|---|---|---|---|
| 2007/0267893 | A1* | 11/2007 | Dammann | ............. B62D 33/06 |
| | | | | 296/187.09 |
| 2009/0322122 | A1* | 12/2009 | Ebinger | ............... B62D 33/067 |
| | | | | 296/190.07 |
| 2010/0187860 | A1* | 7/2010 | Tanaka | ............... B62D 33/0617 |
| | | | | 296/190.08 |
| 2015/0130218 | A1* | 5/2015 | Levin | ..................... B60N 2/544 |
| | | | | 296/187.09 |
| 2018/0015965 | A1* | 1/2018 | Martin | ................... B62D 21/04 |
| 2019/0276102 | A1 | 9/2019 | Zuleger et al. | |
| 2020/0290237 | A1 | 9/2020 | Steffens et al. | |
| 2020/0291846 | A1 | 9/2020 | Steffens et al. | |
| 2021/0171137 | A1 | 6/2021 | Zuleger et al. | |
| 2022/0072736 | A1 | 3/2022 | Steffens et al. | |
| 2022/0118854 | A1 | 4/2022 | Davis et al. | |
| 2023/0150584 | A1* | 5/2023 | Zeamer | .................. B62D 21/09 |
| | | | | 180/89.12 |
| 2023/0159104 | A1* | 5/2023 | Archer | ................... A62C 27/00 |
| | | | | 296/187.03 |

FOREIGN PATENT DOCUMENTS

| | | | | | |
|---|---|---|---|---|---|
| DE | 4103782 | A1 | * | 8/1992 | ............. B60R 19/56 |
| DE | 19847984 | A1 | * | 4/2000 | ........... B62D 21/155 |
| DE | 19909432 | A1 | * | 9/2000 | ........... B62D 33/063 |
| DE | 69909807 | T2 | * | 4/2004 | ........... B62D 21/152 |
| DE | 19747940 | B4 | * | 9/2004 | ........... B62D 21/152 |
| DE | 102005028770 | A1 | * | 12/2006 | ............. B62D 21/15 |
| DE | 102006017729 | A1 | * | 10/2007 | ........... B62D 21/152 |
| DE | 102009041080 | A1 | * | 4/2010 | ........... B62D 33/067 |
| EP | 0584541 | A2 | * | 3/1994 | ............. B60R 19/56 |
| EP | 1477391 | A2 | * | 11/2004 | ........... B62D 21/152 |
| EP | 3480084 | A1 | * | 5/2019 | ........ B62D 33/0604 |
| JP | H08156827 | A | * | 6/1996 | ............. B62D 1/197 |
| JP | H08175440 | A | * | 7/1996 | |
| JP | H0958531 | A | * | 3/1997 | |
| JP | H107029 | A | * | 1/1998 | |
| JP | H1045041 | A | * | 2/1998 | |
| JP | H10175563 | A | * | 6/1998 | ............. B62D 33/06 |
| JP | H10236342 | A | * | 9/1998 | |
| JP | 10278845 | A | * | 10/1998 | |
| JP | H1178996 | A | * | 3/1999 | |
| JP | H11170942 | A | * | 6/1999 | |
| JP | H11171052 | A | * | 6/1999 | |
| JP | H11208516 | A | * | 8/1999 | |
| JP | 2001151162 | A | * | 6/2001 | |
| JP | 3260296 | B2 | * | 2/2002 | |
| JP | 2004291754 | A | * | 10/2004 | |
| JP | 2005255096 | A | * | 9/2005 | |
| KR | 20090062856 | A | * | 6/2009 | ............. B62D 25/20 |
| RU | 2724508 | C2 | * | 6/2020 | ............. B23K 26/21 |
| WO | WO-03066412 | A1 | * | 8/2003 | ............. B62D 1/197 |
| WO | WO-03101809 | A1 | * | 12/2003 | ............. B62D 21/15 |
| WO | WO-2006035477 | A1 | * | 4/2006 | ........ B62D 33/0604 |
| WO | WO-2006100007 | A1 | * | 9/2006 | ........... B62D 33/067 |
| WO | WO-2007073771 | A1 | * | 7/2007 | ........... B62D 21/152 |
| WO | WO-2008047749 | A1 | * | 4/2008 | ............. B62D 33/06 |
| WO | WO-2016041590 | A1 | * | 3/2016 | ........... B62D 33/067 |
| WO | WO-2017110735 | A1 | * | 6/2017 | ............. B62D 33/10 |
| WO | WO-2019219179 | A1 | * | 11/2019 | ............. B62D 21/15 |

OTHER PUBLICATIONS https://www.youtube.com/watch?v=NQFtAnm7D-c; "All-New Mack LR Electric Garbage Truck." Retrieved on Mar. 21, 2023.

* cited by examiner

VEHICLE WITH IMPACT-MITIGATING CAB

CROSS-REFERENCE TO RELATED PATENT APPLICATION

This application claims the benefit of and priority to U.S. Provisional Application No. 63/485,767, filed on Feb. 17, 2023, the entire disclosure of which is hereby incorporated by reference herein.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a refuse vehicle. The refuse vehicle includes a chassis having a frame member, the frame member extending longitudinally along an axis of the chassis. The refuse vehicle also includes a front axle assembly coupled to the chassis, the front axle assembly including a front axle and front tractive elements coupled to the front axle, and a rear axle assembly coupled to the chassis, the rear axle assembly including a rear axle and rear tractive elements coupled to the rear axle. The refuse vehicle further includes a mount coupled to the frame member and extending from a front portion of the frame member, the mount having a receiver extending laterally along the mount. The refuse vehicle also includes a cab movably coupled to the frame member and the mount. The cab includes a cab frame member coupled to the frame member, the cab frame member extending longitudinally between a front end of the cab and a rear end of the cab, a cab cross-member coupled to the cab frame member, the cab cross-member extending laterally from the cab frame member, and a brace coupled to the cab frame member. The cab cross-member is coupled to the cab frame member forward relative to the receiver, and where in response to a force being applied to the front end of the cab, the cab is configured to move rearward relative to the mount and the cab cross-member is configured to engage the receiver.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle (e.g., a refuse vehicle, etc.) of the present disclosure includes apparatuses and systems for transferring forces in order to reduce stress on vehicle components. In an exemplary embodiment, a mount coupled to the frame and the cab includes structural elements that are configured to transfer and/or receive forces, in order to reduce forces applied to components that couple the frame and the cab (e.g., isolator).

Overall Vehicle

Figure 1:
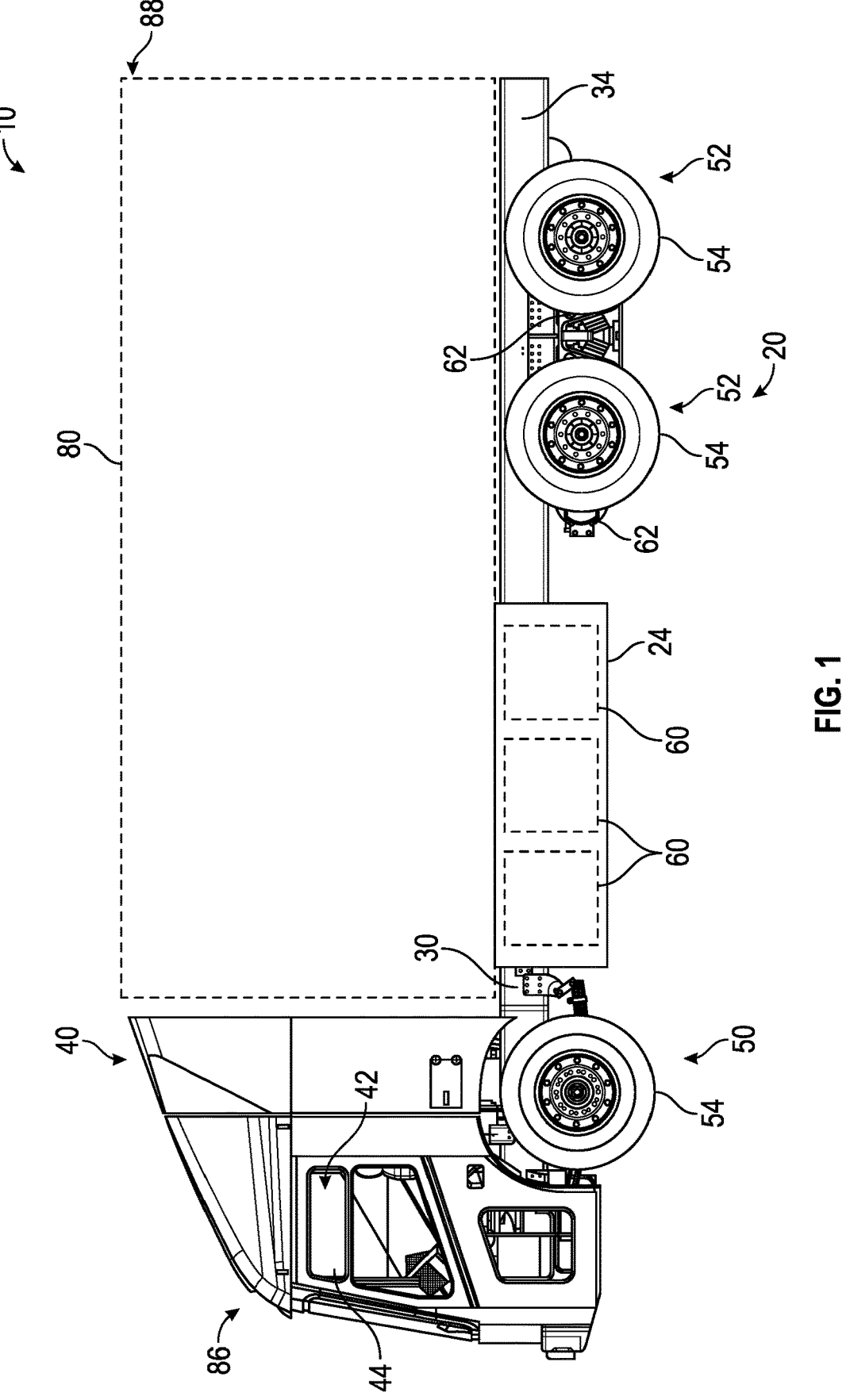
FIG. 1 is a left side view of a vehicle, according to an exemplary embodiment.
Figure 2:
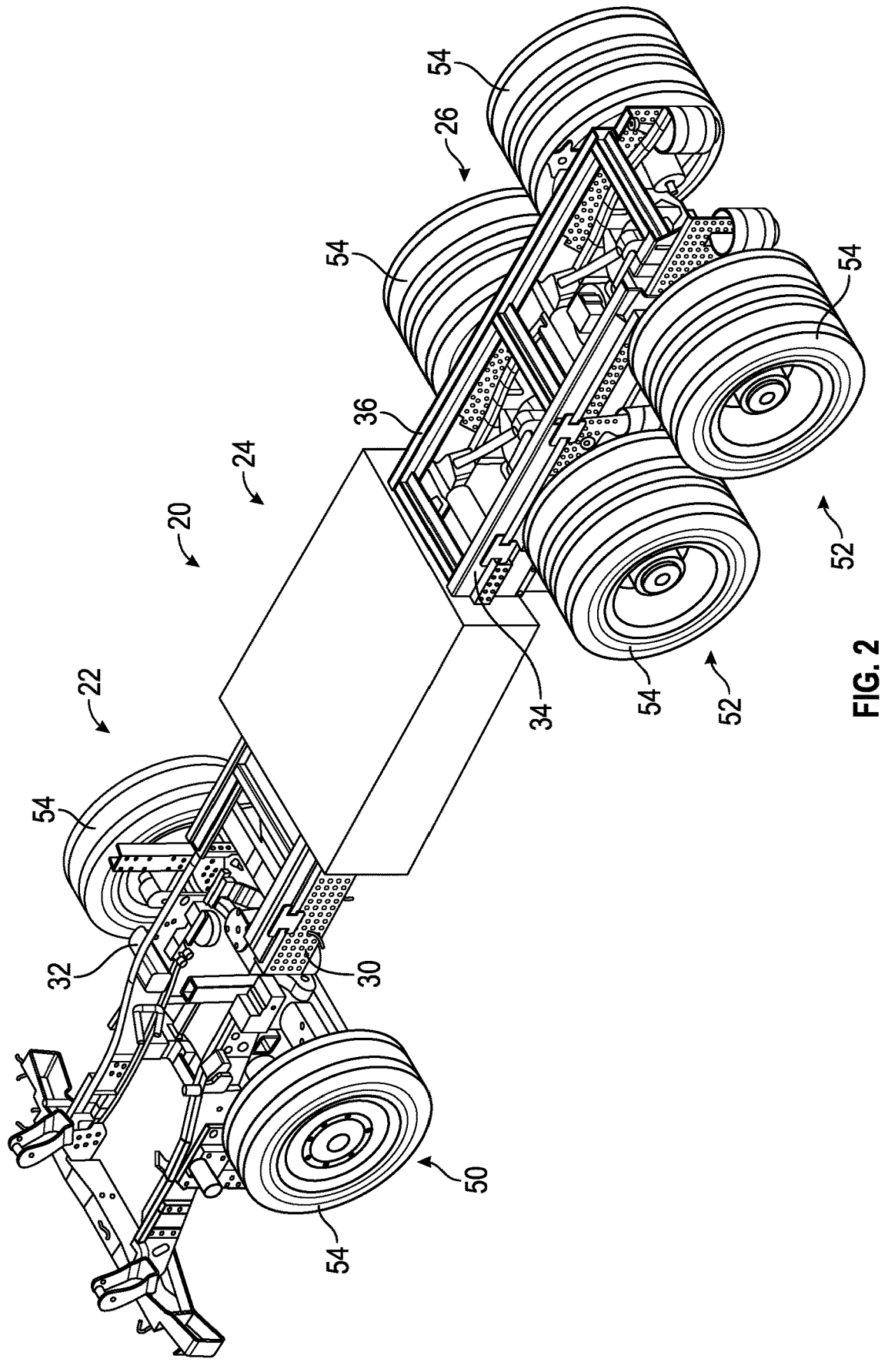
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, I, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.).

The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles 52 may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
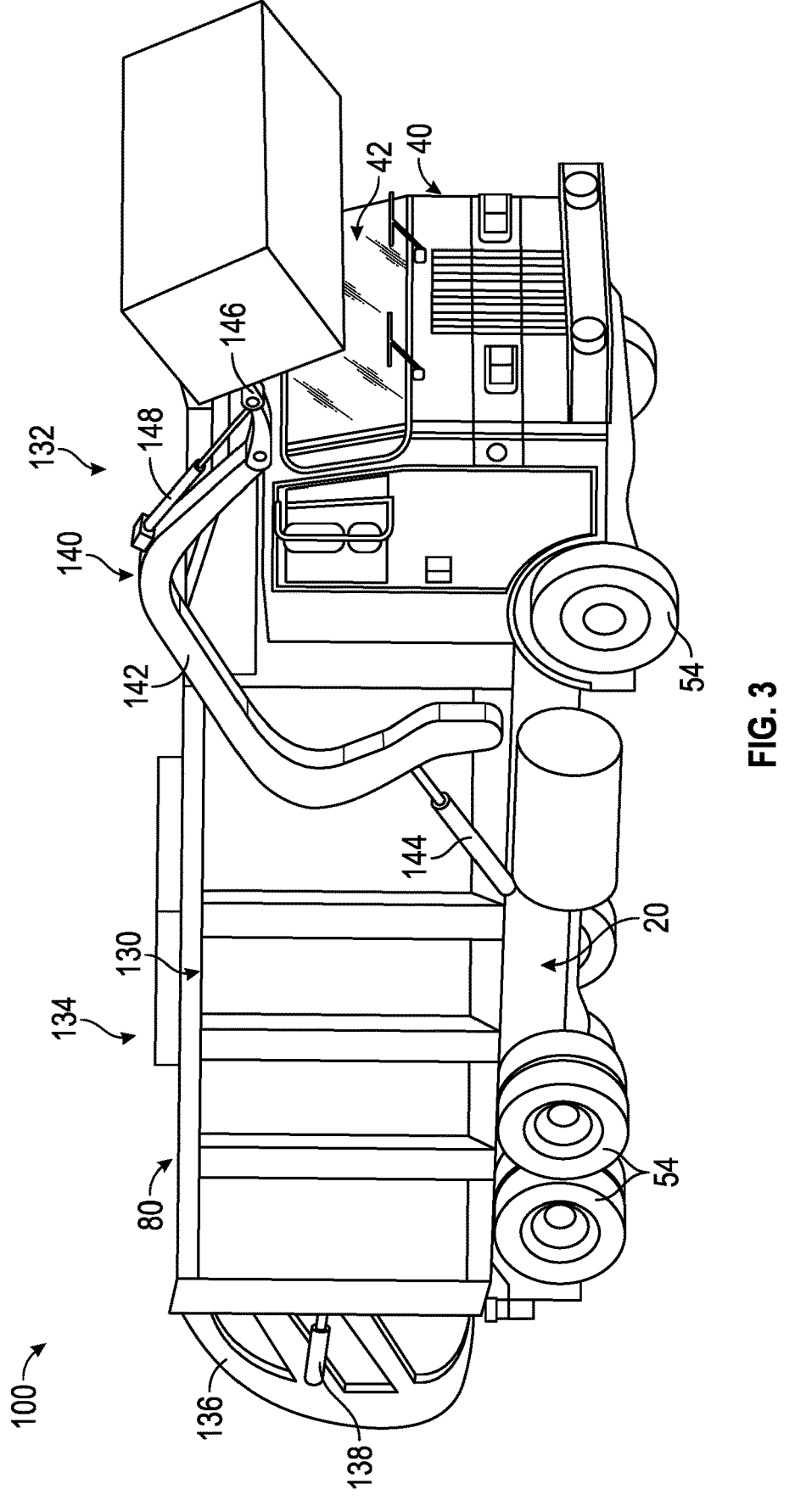
FIG. 3 is a perspective view of the vehicle of FIG. 1 configured as a front-loading refuse vehicle, according to an exemplary embodiment.
Figure 4:
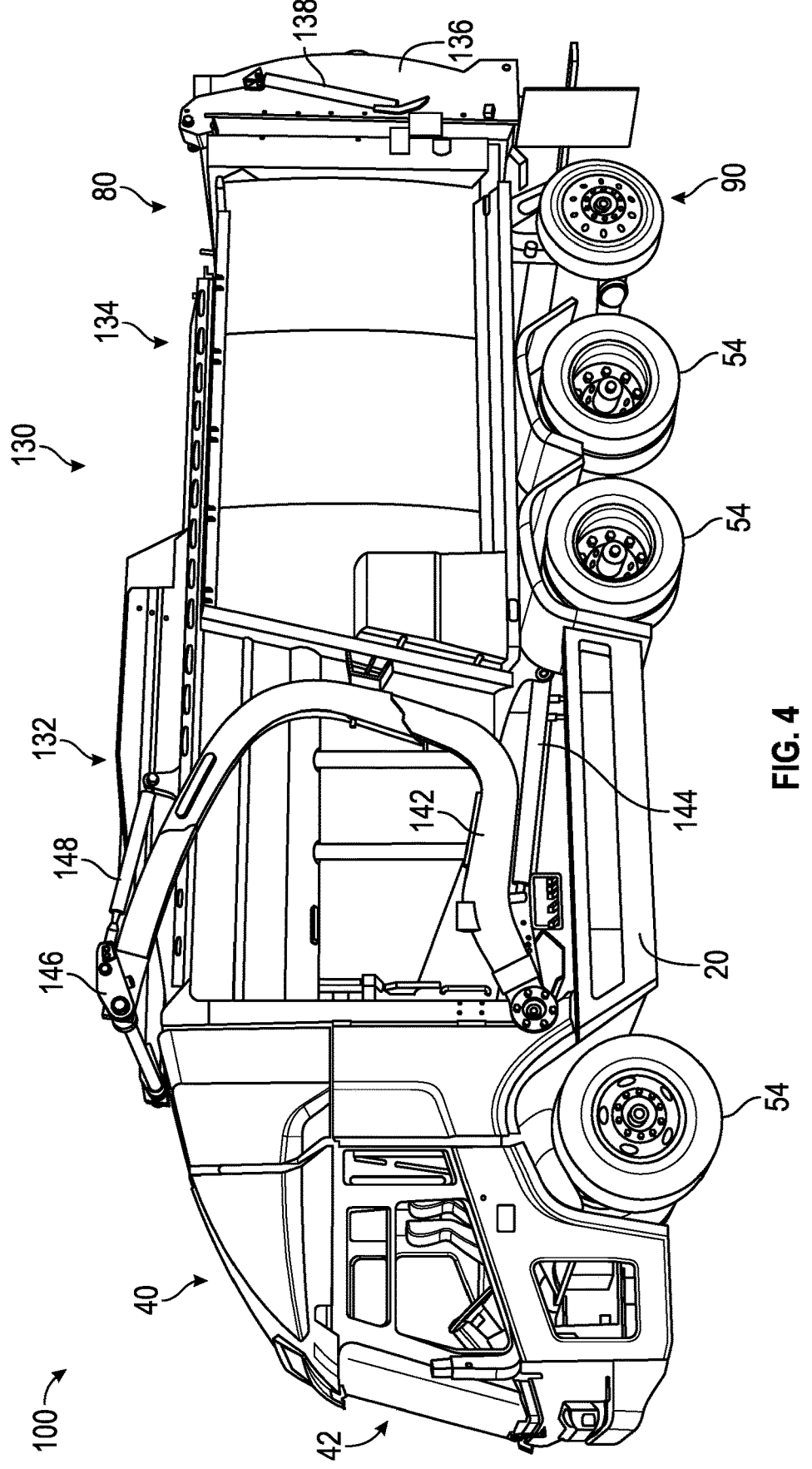
FIG. 4 is a left side view of the front-loading refuse vehicle of FIG. 3 configured with a tag axle.
Figure 5:
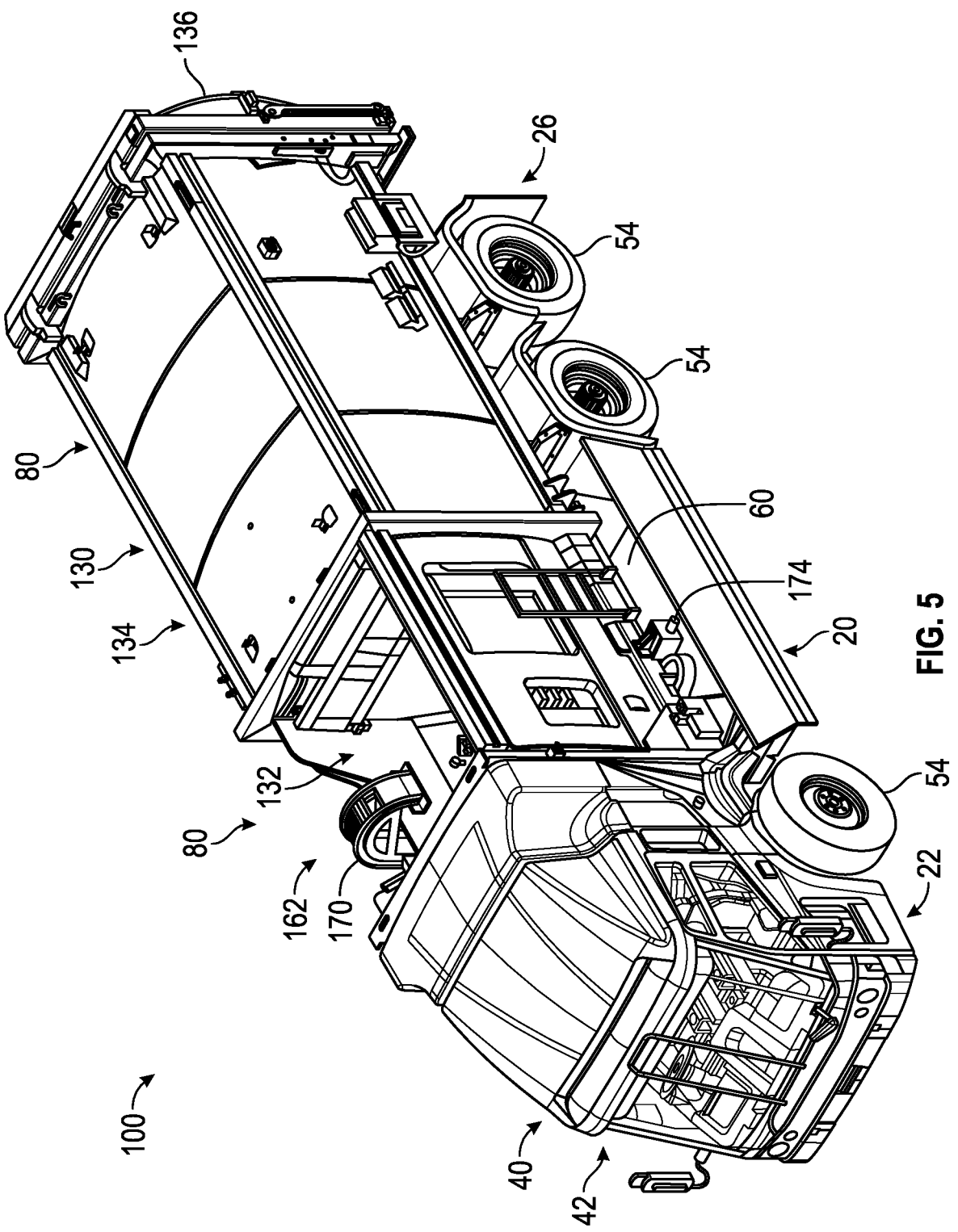
FIG. 5 is a perspective view of the vehicle of FIG. 1 configured as a side-loading refuse vehicle, according to an exemplary embodiment.
Figure 6:
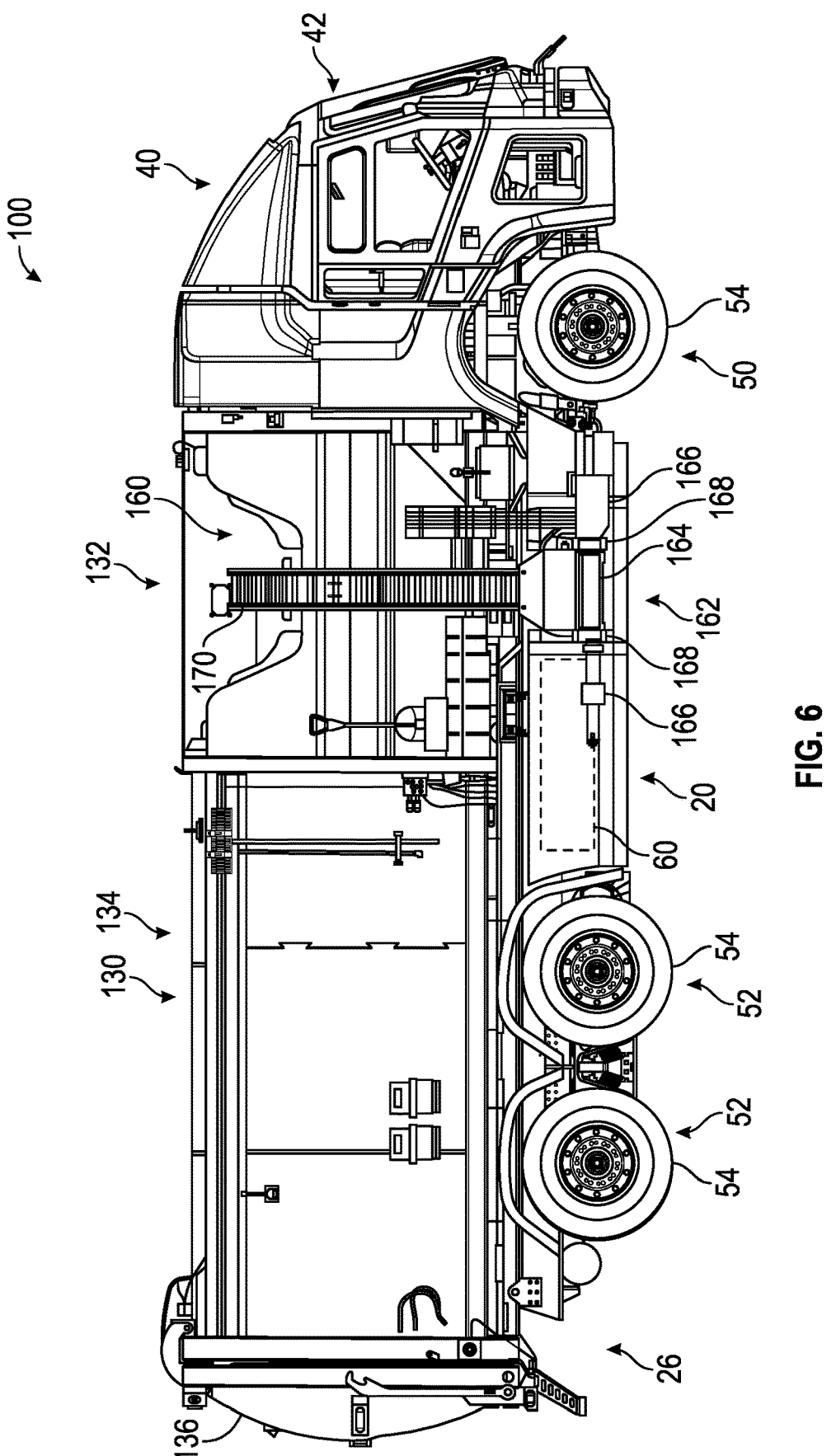
FIG. 6 is a right side view of the side-loading refuse vehicle of FIG. 5.
Figure 7:
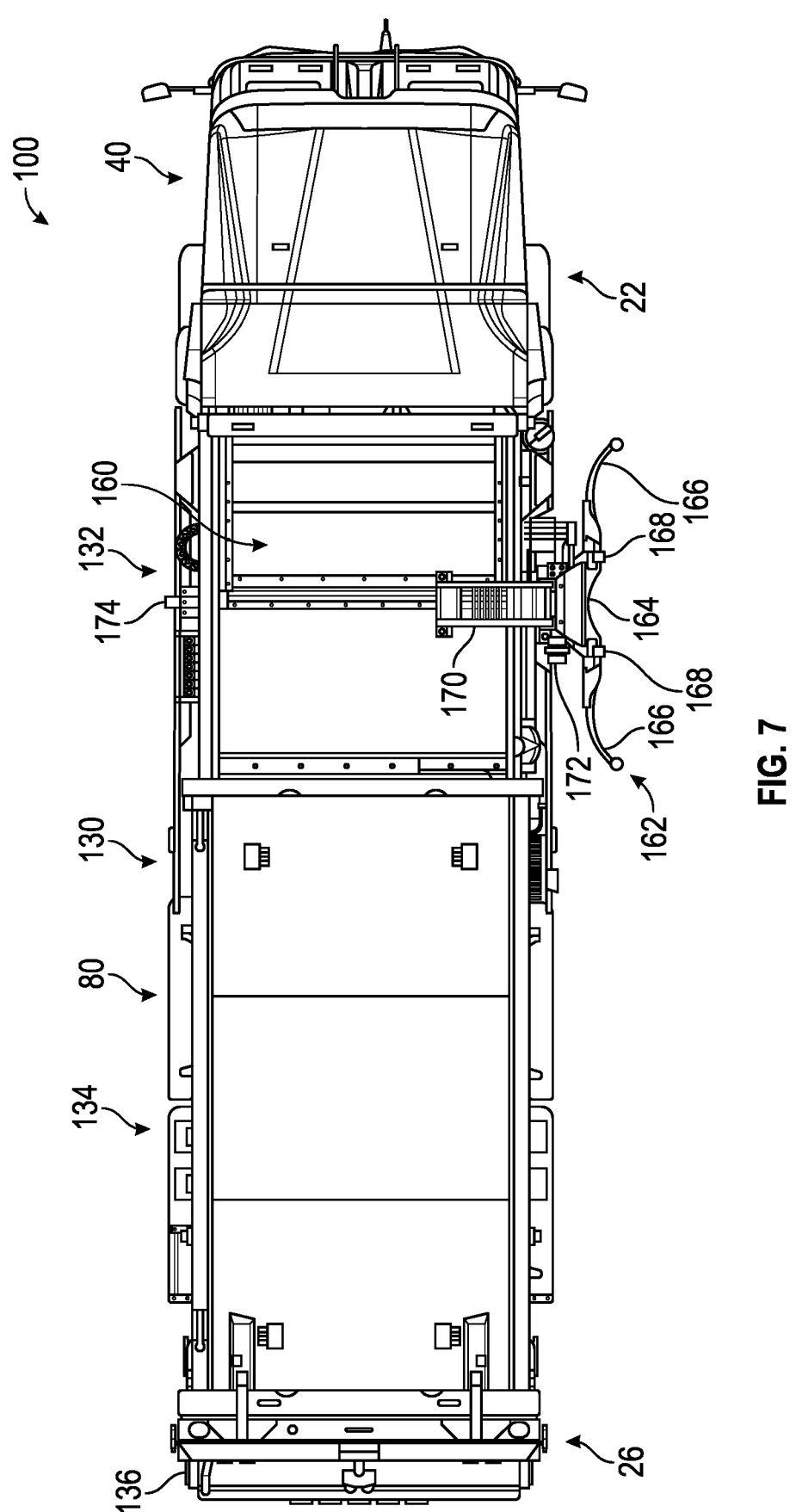
FIG. 7 is a top view of the side-loading refuse vehicle of FIG. 5.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively couple the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 8:
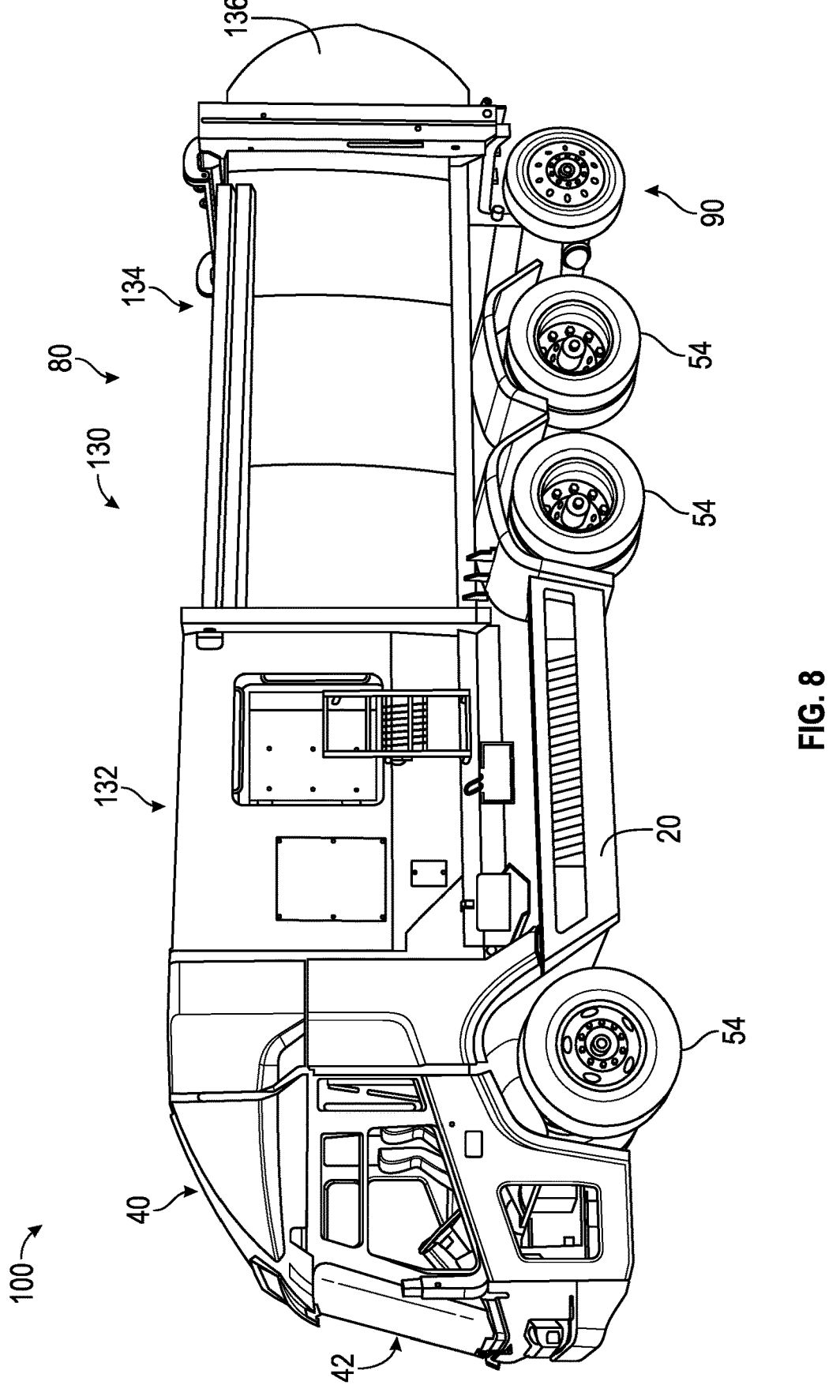
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown in FIG. 8, the refuse vehicle 100 of FIGS. 5-7 may be configured with a tag axle 90.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
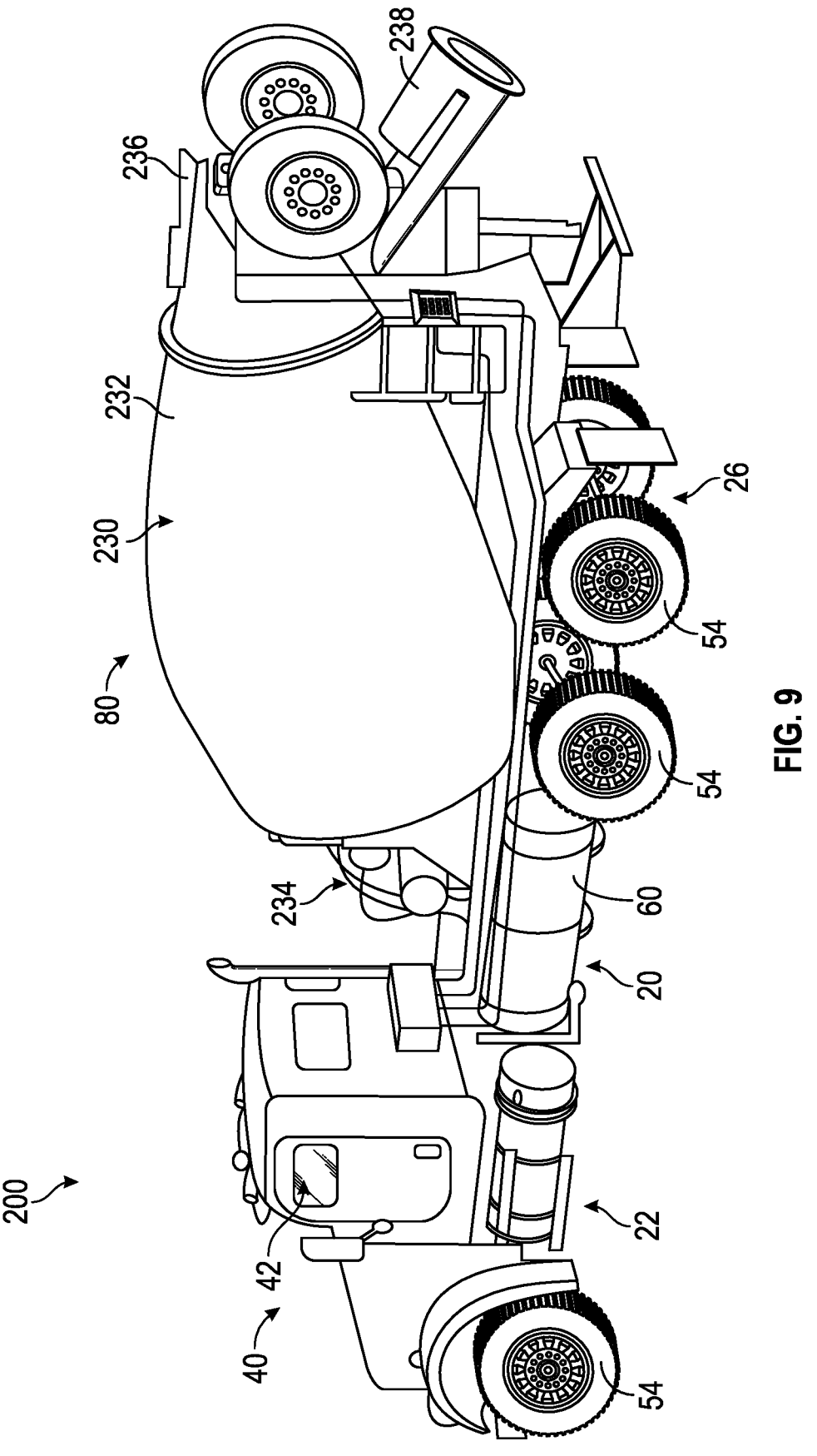
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
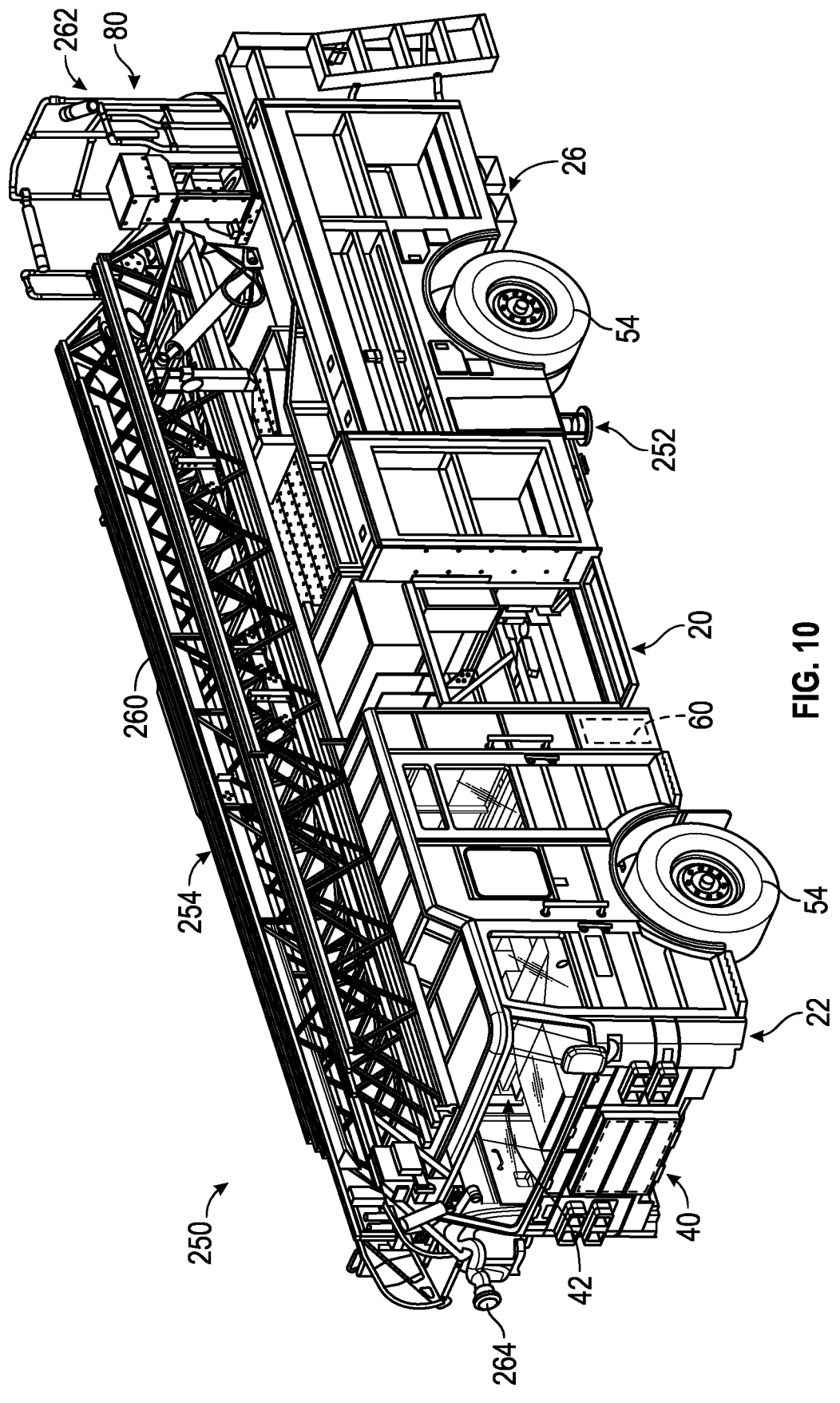
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
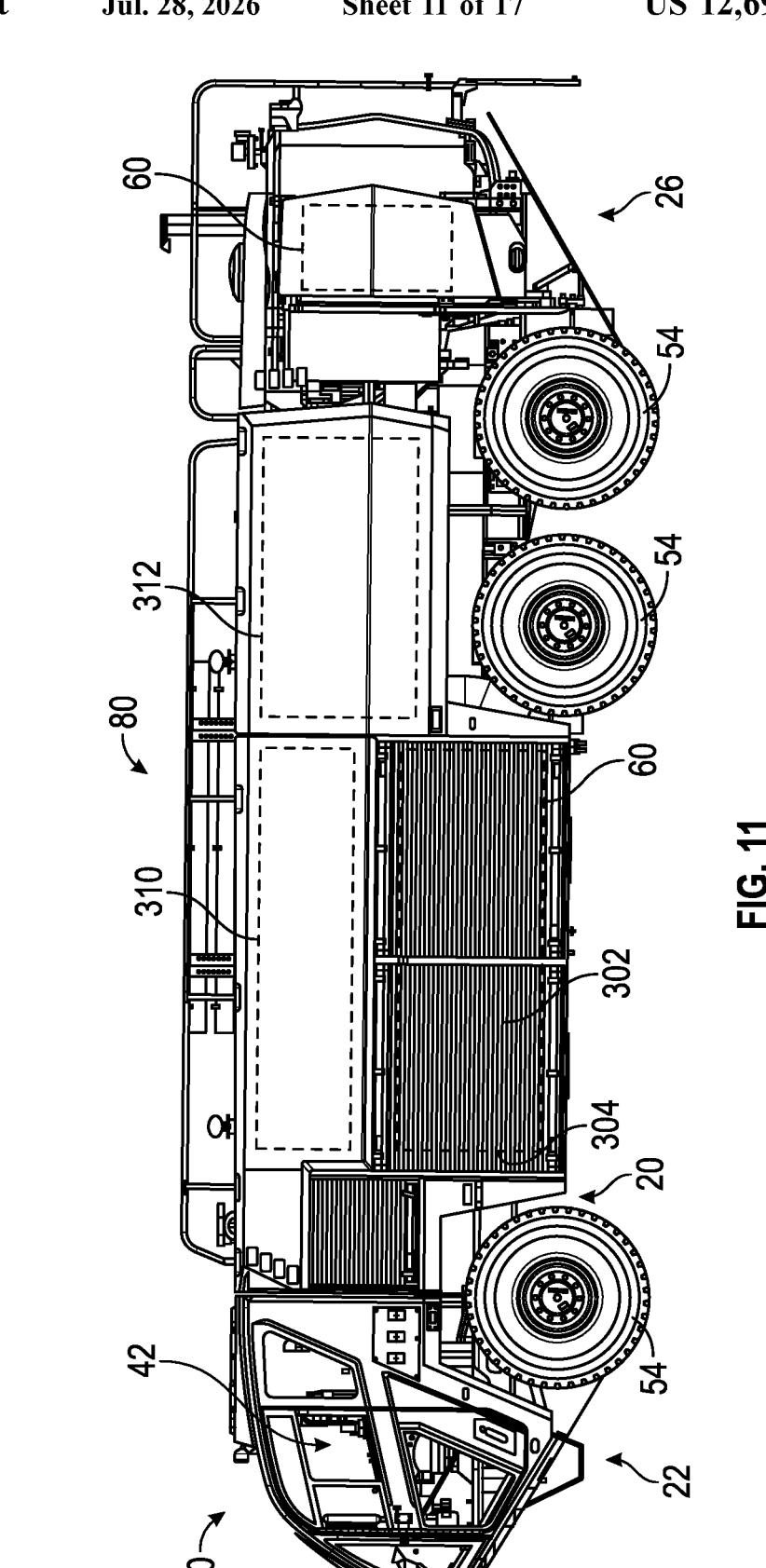
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab

40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
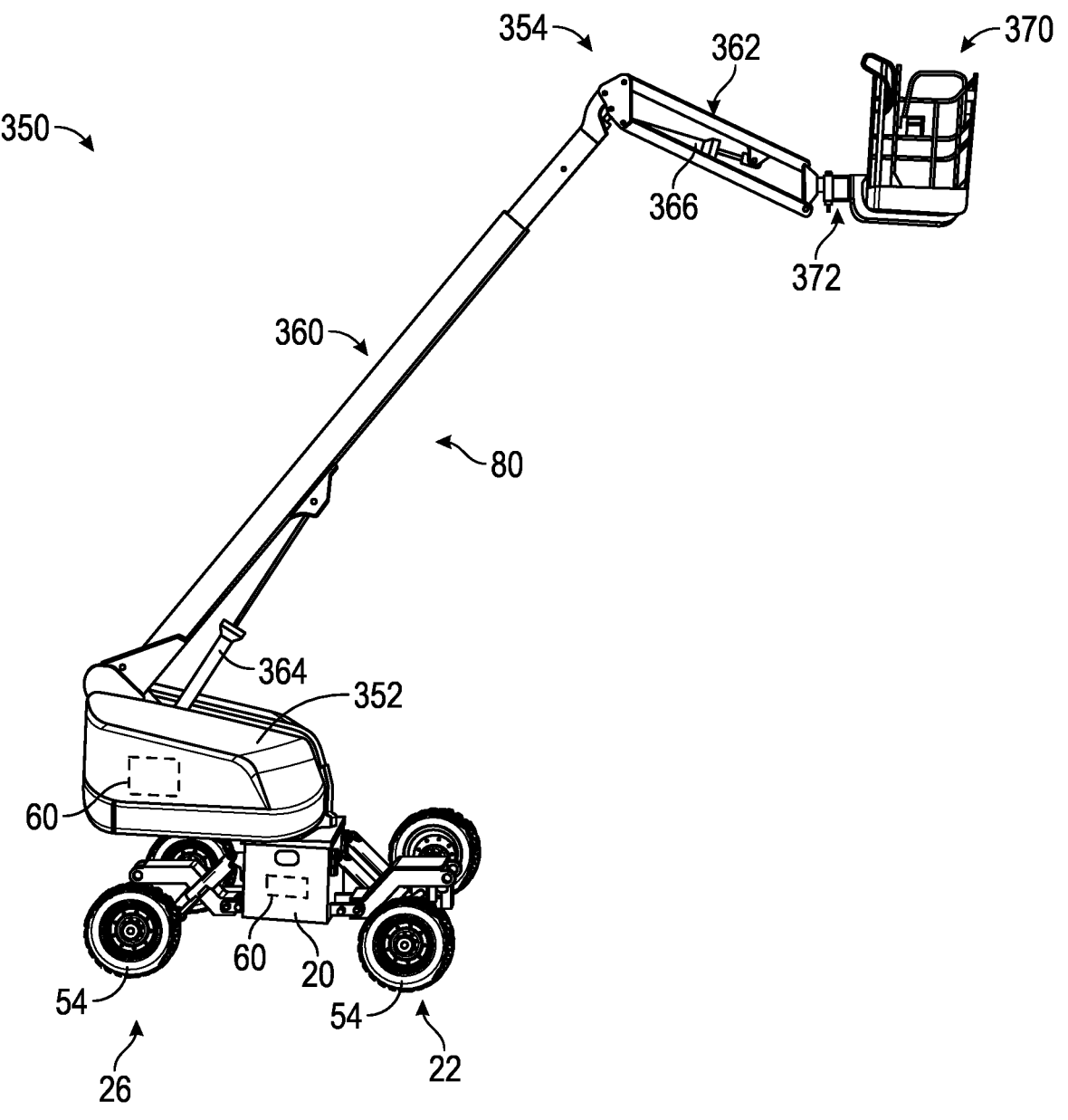
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
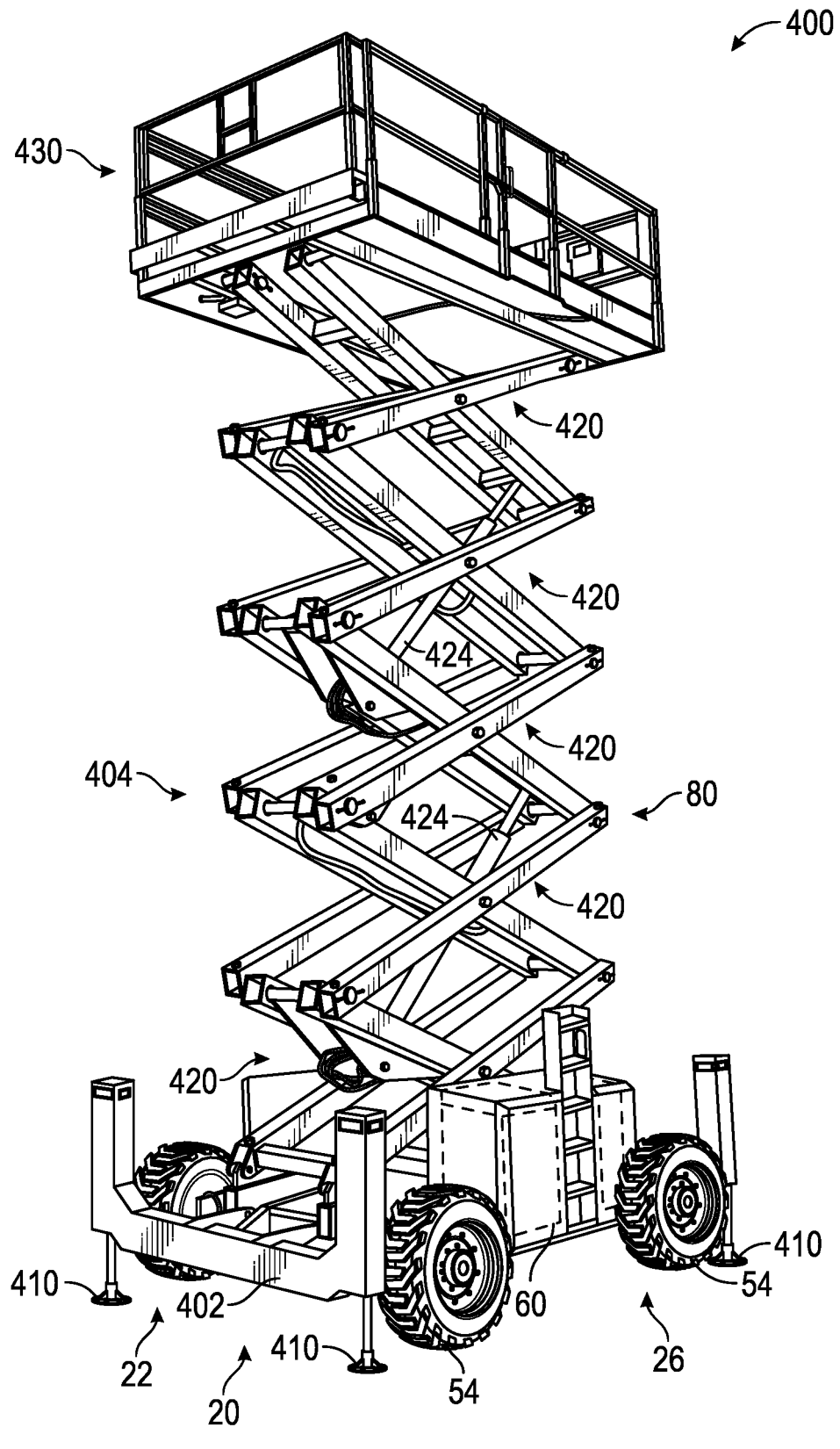
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Vehicle with Impact-Mitigating Cab

According to the exemplary embodiment shown in FIGS. 14-17, the vehicle 10 is configured as the refuse vehicle 100 and the body component is configured as the cab 40. However, in various other embodiments, the vehicle 10 and the body component of FIGS. 14-17 can be any of the vehicles and/or body components described herein. As shown in at least FIG. 14, the cab 40 (not shown) is coupled to the front end portion of the chassis 20 (e.g., the front section 22 of the chassis 20). Together, the chassis 20 and the cab 40 define a front end of the vehicle 10, and the cab 40 extends above the chassis 20.

Figure 14:
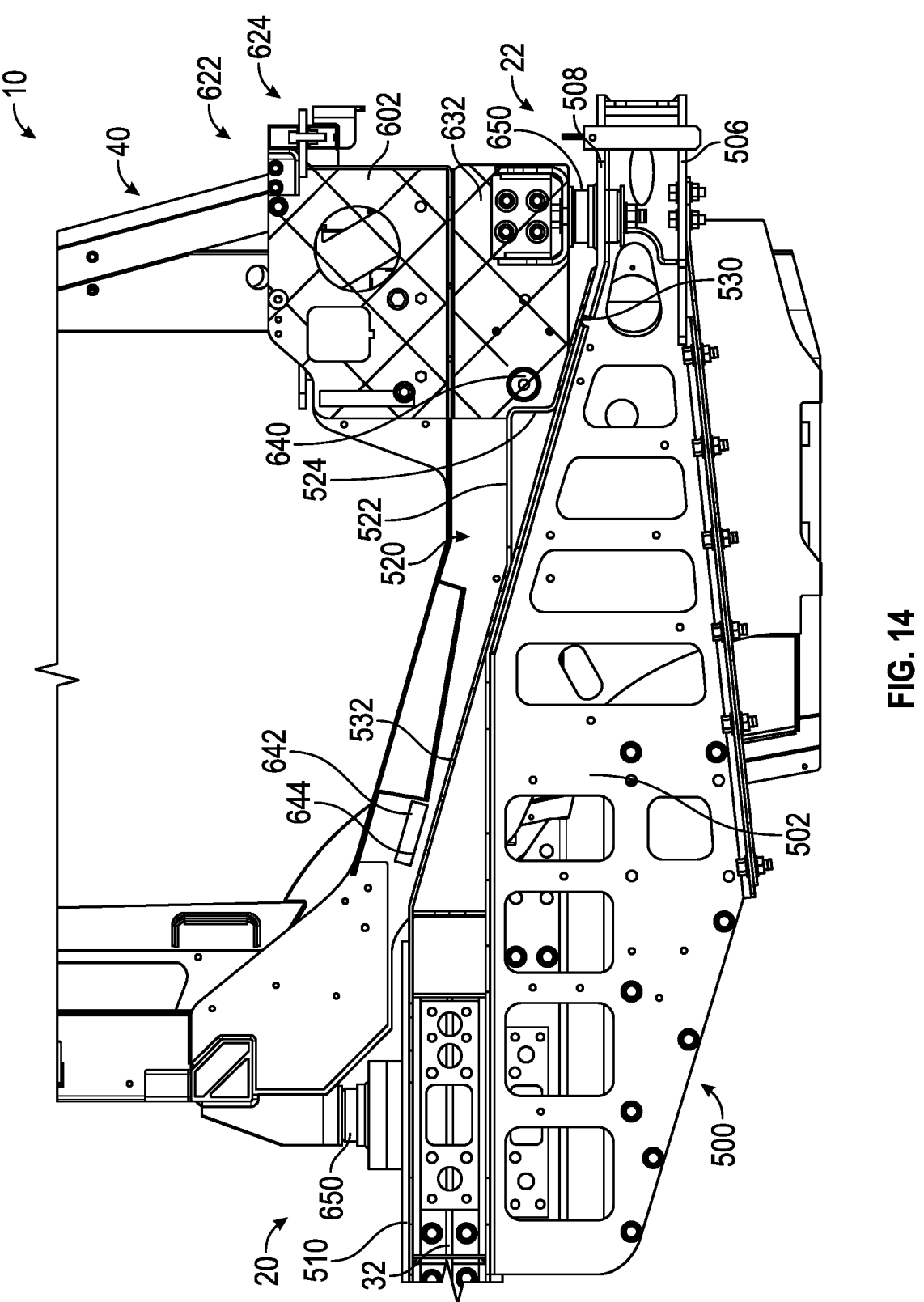
FIG. 14 is a right side cross-sectional view of the vehicle of FIG. 1, according to an exemplary embodiment.
Figure 15:
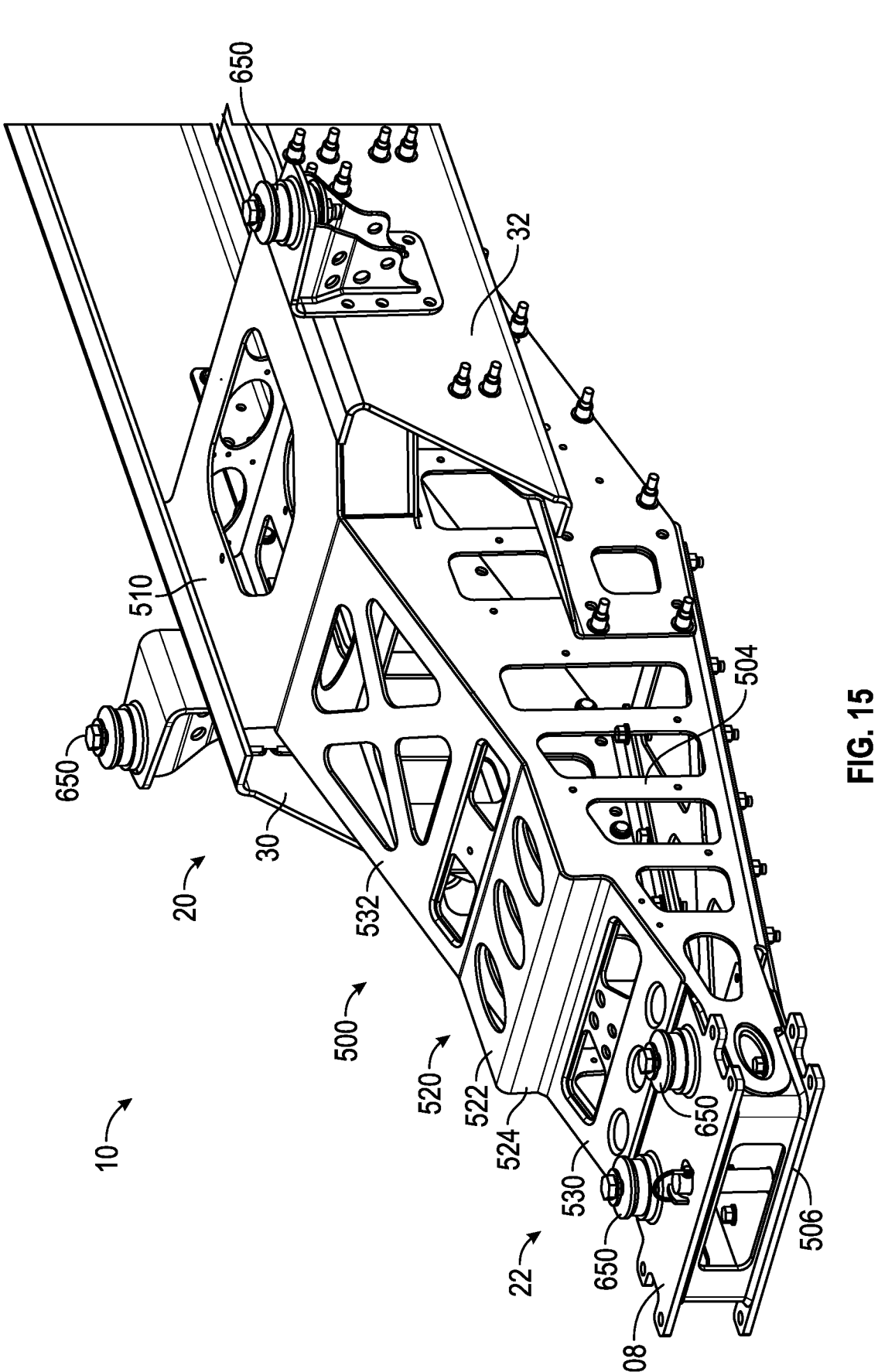
FIG. 15 is a left side perspective cross-sectional view of the vehicle of FIG. 1, according to an exemplary embodiment.

As shown in FIGS. 14-15, the front section 22 includes a pair of frame portions, frame members, or frame rails, shown as the front rail portion 30 (as shown in at least FIG. 15) and front rail portion 32 (as shown in at least FIGS. 14-15). The front rail portions 30, 32 are longitudinally extending rail portions (e.g., extend from the front section 22 toward the middle section 24). The front rail portions 30, 32 may define a centerline of the vehicle 10, which may (run parallel and) be between the front rail portion 30 and the front rail portion 32. In an exemplary embodiment, components of the vehicle 10 (e.g., the cab 40) are coupled to the front rail portions 30, 32, either directly or through another component (as discussed below). In some embodiments, a portion of the front rail portions 30, 32 include a C-shaped cross-section, which includes a base section and two leg sections that are substantially perpendicular to the base section. In other embodiments, a portion of the front rail portions 30, 32 are other suitable elongated structural members (e.g., e.g., a beam, channel, tubing, extrusion, etc.) of any suitable cross-sectional shape (e.g., .g., H-profile, I-profile, U-profile, L-profile, square, rectangular, etc. having a top section, a base section, a bottom section, etc.). In some embodiments, a portion of the front rail portions 30, 32 include fewer, additional, and/or different components (e.g. sidewalls, support walls, extensions or walls that extend, side plates, etc.).

As shown in FIGS. 14-17, the front section 22 further includes a body mount, a cab mount, a cab mount assembly, a frame extension, a frame mount extension, or a cab mount extension, shown as mount 500. The mount 500 may be configured to couple the front rail portions 30, 32 and/or other components of the vehicle 10 (e.g., the cab 40), for example to couple components of the vehicle 10 to the front rail portions 30, 32. In an exemplary embodiment, the mount 500 couples the front rail portions 30, 32, and extends from the front rail portions 30, 32 in a forward direction (e.g., away from the middle section 24). The mount 500 may further couple the cab 40, for example to support and/or stabilize the cab 40. The mount 500 may extend from the front rail portions 30, 32 in a direction (e.g., a forward direction) parallel to, or substantially parallel to, the front rail portions 30, 32. In some embodiments, the mount 500, or a portion thereof, extends from the front rail portions 30, 32 a distance below the front rail portions 30, 32.

Figure 16:
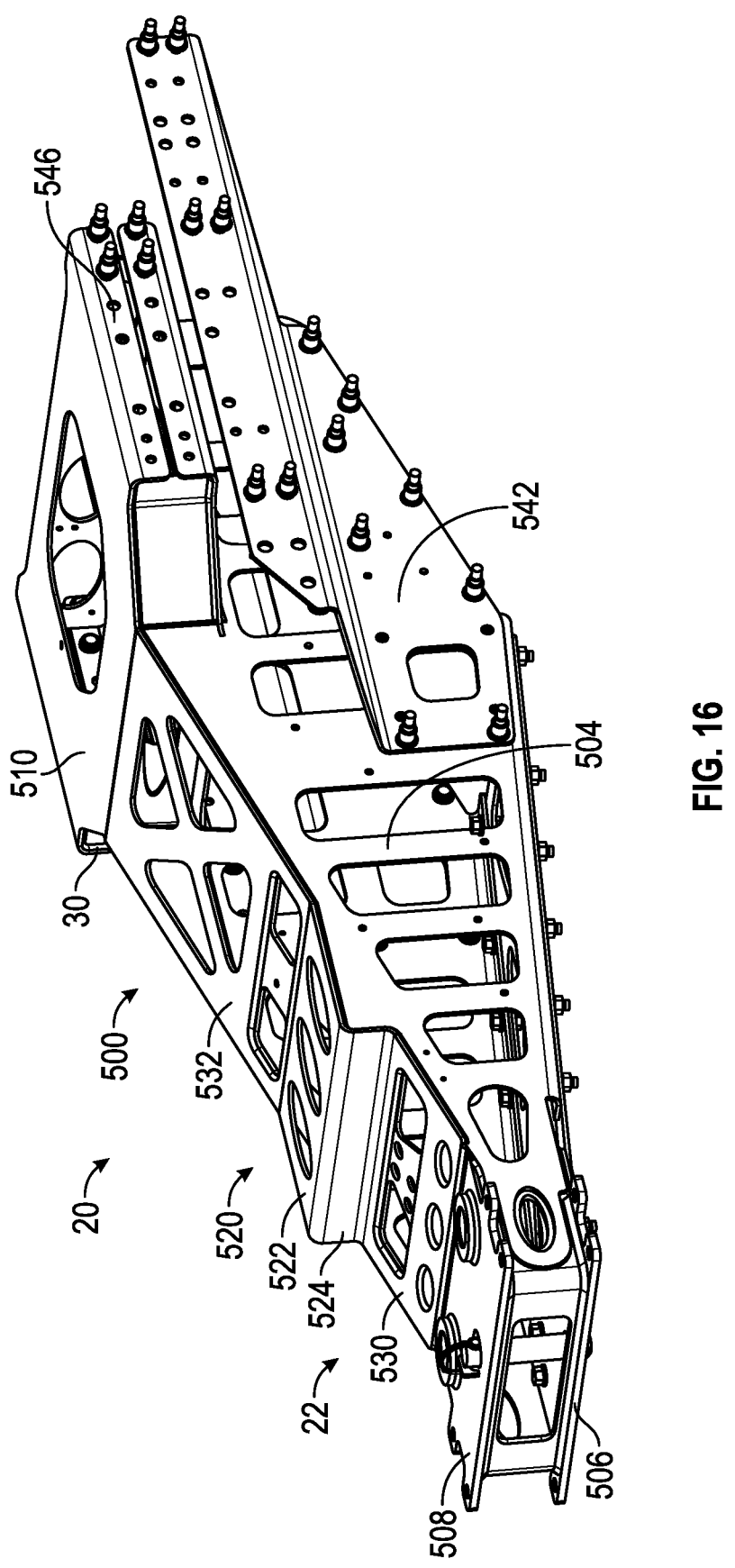
FIG. 16 is a left side perspective cross-sectional view of the vehicle of FIG. 1, according to an exemplary embodiment.

As shown in FIGS. 14-16, the mount 500 includes a pair of frame portions, frame members, side portions, or side members, shown as sidewall 502 (as shown in at least FIG. 14) and sidewall 504 (as shown in at least FIGS. 15-16). The sidewalls 502, 504 may be coupled with the front rail portions 30, 32. The sidewalls 502, 504 may extend from the front rail portions 30, 32 in a direction (e.g., a forward direction) parallel to, or substantially parallel to, the front rail portions 30, 32 (e.g., a centerline, or center plane of the front rail portions 30, 32). The sidewalls 502, 504 may be longitudinally extending portions (e.g., extend from the front rail portions 30, 32), and may define a centerline of the mount 500, which may (run parallel and) be between the sidewall 502 and the sidewall 504. A portion of the sidewalls 502, 504 (e.g., a front portion, lower portion) may extend from the front rail portions 30, 32 a distance below the front rail portions 30, 32. One or more portions of the sidewalls 502, 504 (e.g., a rear portion, a front portion) may be tapered, for example to form a tapered or triangular side profile at a portion (e.g., a front portion) of the sidewalls 502, 504. The sidewalls 502, 502 may include one or more apertures or openings. For example, the sidewalls 502, 504 may include apertures or openings that extend from a top edge to a bottom edge of the sidewall. In an exemplary embodiment, each of the sidewalls 502, 504 are formed as a uniform component and/or of a suitable material (e.g., metal, steel, sheet metal, etc.). In some embodiments, each of the sidewalls 502, 504 are formed of a plurality of components (e.g., a plurality of metal panels, sheet metal panels, etc.).

As shown in FIGS. 14-16, the mount 500 further includes a lower or bottom panel, shown as lower panel 506, an upper or top support panel, shown as top support panel 508, and a rear or cab support panel, shown as cab support panel 510. The lower panel 506, top support panel 508, and/or the cab support panel 510 may be coupled with the sidewalls 502, 504 and extend there between. The lower panel 506 may be positioned at a bottom or lower portion of the mount 500 (e.g., at bottom edges of the sidewalls 502, 504). The top support panel 508 may be positioned at a forward portion of the mount 500 (e.g., a forward portion of the sidewalls 502, 504, a front of the vehicle 10, etc.). The cab support panel 510 may be positioned rearward relative to the top support panel 508, for example at a rear portion of the mount 500 (e.g., a rear portion of the sidewalls 502, 504, toward the middle section 24 of the vehicle 10, etc.). The top support panel 508 may be positioned a distance below or lower relative to the cab support panel 510 (as shown in at least FIGS. 15-16). The top support panel 508 may be configured to support a front portion of one or more components of the vehicle 10, for example a front portion of the cab 40. The cab support panel 510 may be configured to support a rear or body portion of the cab 40. In this regard, the top support panel 508 may be configured to support a front portion of the cab 40 having components that facilitate operation of the vehicle 10 (e.g., pedals), and the cab support panel 510 may be configured to support a portion of the cab 40 having components that facilitate operator comfort (e.g., seats, seatbelts, etc.). In an exemplary embodiment, the lower panel 506, the top support panel 508, and/or the cab support panel 510 extend along the mount 500 along one or more planes that is/are aligned. For example, the lower panel 506, the top support panel 508, and/or the cab support panel 510 may extend along the mount 500 along one or more planes that is/are aligned with the centerline (e.g., center plane) of the mount 500.

As shown in FIGS. 14-16, the mount 500 also includes a projecting, protruding, or extending portion, shown as receiver 520. In some embodiments, the receiver 520 is integrated with one or more components of the mount 500. For example, the sidewalls 502, 504 may include a portion that extends from a body or base of the sidewalls 502, 504 (e.g., a tapered or triangular portion). The projecting or extending portion forms a portion of the sidewalls 502, 504 that protrudes or projects from the body or base of the sidewalls 502, 504 (e.g., to form the receiver 520). The receiver 520 may be positioned rearward relative to the top support panel 508 (e.g., rearward relative to a front portion of the mount 500). For example, the receiver 520 may be positioned between the top support panel 508 and the cab support panel 510 (e.g., beneath a body portion of the cab 40). In an exemplary embodiment, components of the receiver 520 are configured to engage (e.g., catch, receive, stop, contact, couple, etc.) a component of the cab 40, for example in response to movement of the cab 40 (as discussed below).

In an exemplary embodiment, the receiver 520 includes a support, shown as support panel 522, and a stop (e.g., catch, engagement surface, receiver, etc.), shown as receiving panel 524. The support panel 522 and the receiving panel 524 may be coupled with the sidewalls 502, 504, and extend there between. The support panel 522 may be positioned at a top portion (e.g., define a top surface) of the receiver 520, and the receiving panel 524 may be positioned at a forward portion (e.g., define a front surface) of the receiver 520. As shown in FIGS. 14-16, the support panel 522 may extend along the mount 500 along a plane that is aligned with the centerline (e.g., center plane) of the mount 500. For example, the support panel 522 may extend along a plane that is parallel to one or more planes of the lower panel 506, the top support panel 508, and/or the cab support panel 510. In an exemplary embodiment, the receiving panel 524 is misaligned with the support panel 522. For example, the receiving panel 524 may extend along a plane that is perpendicular to a plane of the support panel 522. In other embodiments, the receiving panel 524 is otherwise aligned or positioned relative to the support panel 522 (e.g., angled at 5, 10, 15, 20, 25, 45 75, 100, etc. degrees) and/or the lower panel 506, the top support panel 508, and/or the cab support panel 510. While the receiver 520 (e.g., the support panel 522, the receiving panel 524) is shown to include panels, it should be understood that the receiver 520 (e.g., the support panel 522, the receiving panel 524) can be or include additional, fewer, and/or different working components (e.g., a hook, metal blood, check plate, machined cub or slab, peg, pin, one or more engagement surfaces, etc.).

As shown in FIGS. 14-16, the mount 500 further includes one or more connecting portions, connecting members, or connecting panels, shown as a first connecting panel 530 and a second connecting panel 532. The first connecting panel 530 and the second connecting panel 532 can be coupled with the sidewalls 502, 504, and extend there between. The first connecting panel 530 may be coupled with the top support panel 508 (e.g., along a first edge) and the receiver 520 (e.g., the receiving panel 524 along a second edge). In this regard, the first connecting panel 530 may extend between (e.g., connect) the top support panel 508 and the receiver 520 (e.g., the receiving panel 524). The second connecting panel 532 may be coupled with the receiver 520 (e.g., the support panel 522 at a first edge) and the cab support panel 510. In this regard, the second connecting panel 532 may extend between (e.g., connect) the receiver 520 (e.g., the support panel 522) and the cab support panel 510.

In an exemplary embodiment, the first connecting panel 530 and/or the second connecting panel 532 is/are angled relative to a component of the mount 500. For example, as shown in FIGS. 14-16 the first connecting panel 530 is angled relative to the top support panel 508, and the second connecting panel 532 is angled relative to the support panel 522 of the receiver 520. In an exemplary embodiment, the first connecting panel 530 and/or the second connecting panel 532 extend along the mount 500 along one or more planes that are misaligned with a plane of any one of the panels 506-510 and/or support panel 522. For example, the first connecting panel 530 and/or the second connecting panel 532 may be misaligned with the lower panel 506, the top support panel 508, and/or the cab support panel 510 (e.g., angled at 5, 10, 15, 20, 25, 45 75, 100, etc. degrees). In some embodiments, the first connecting panel 530 and the second connecting panel 532 extend along the mount 500 and are co-planar. For example, the first connecting panel 530 and the second connecting panel 532 can extend along a plane, with the receiver 520 forming an extension, protrusion, or projection between the two components.

As shown in FIG. 16, the mount 500 also includes one or more side mounts. For example, the mount 500 may include a first side mount, or side mount 540 (not shown), and a second side mount, shown as side mount 542. In an exemplary embodiment, the side mounts 540, 542 are configured to couple the front rail portions 30, 32 (respectively) to couple the mount 500 to the frame (e.g., the front rail portions 30, 32). For example, the side mounts 540, 542 can be received within an interior portion of the front rail portions 30, 32 (respectively). In an exemplary embodiment, the side mounts 540, 542 are received at lower flanges of the front rail portions 30, 32 (respectively). In this regard, the side mounts 540, 542 can be configured to engage lower flanges of the front rail portions 30, 32 (respectively) to couple and/or position (e.g., vertically downward, etc.) the mount 500 relative to the frame (e.g., front rail portions 30, 32). The side mounts 540, 542 can be coupled with and extend from the sidewalls 502, 504 (respectively). The side mounts 540, 542 can be coupled at a bottom portion of the mount 500 (e.g., sidewalls 502, 504). In an exemplary embodiment, the side mounts 540, 542 include an extension or arm, which can extend from a base of the side mounts 540, 542 (e.g., outwardly, laterally, upward, etc.). In this regard, the side mounts 540, 542 may be configured to couple the frame (e.g., front rail portions 30, 32) via the extension or arm. In an exemplary embodiment, the side mounts 540, 542 are coupled (e.g., to sidewalls 502, 504) such that the side mounts 540, 542 are aligned, or substantially aligned (e.g., laterally, vertically), on the mount 500.

As shown in FIG. 16, the mount 500 further includes one or more mounting plates. For example, the mount 500 may include a first mounting plate, or mounting plate 544 (not shown), and a second mounting plate, shown as mounting plate 546. In an exemplary embodiment, the mounting plates 544, 546 are configured to couple the front rail portions 30, 32 (respectively) to couple the mount 500 to the frame (e.g., the front rail portions 30, 32). For example, the mounting plates 544, 546 can be received within an interior portion of the front rail portions 30, 32 (respectively). In an exemplary embodiment, the mounting plates 544, 546 are received at upper flanges of the front rail portions 30, 32 (respectively). In this regard, the mounting plates 544, 546 can be configured to engage upper flanges of the front rail portions 30, 32 (respectively) to couple and/or position (e.g., vertically upward, etc.) the mount 500 relative to the frame (e.g., front rail portions 30, 32). The mounting plates 544, 546 can be coupled at a rear portion of the mount 500 (e.g., toward the middle section 24 of the vehicle 10, etc.). For example, the mounting plates 544, 546 can be coupled at the cab support panel 510. The mounting plates 544, 546 can also be coupled at an exterior portion of the mount 500. The mounting plates 544, 546 can be coupled such that the mounting plates 544, 546 are aligned, or substantially aligned (e.g., laterally, vertically), on the mount 500.

Referring still to FIG. 14, the cab 40 is shown to include a cab front section 622 and a cab frame 624. The cab frame 624 includes a pair of frame portions, frame members, or frame rails, shown as a first cab rail portion 630 (shown in at least FIG. 17) and a second cab rail portion 632 (as shown in at least FIG. 14). The cab rail portions 630, 632 are longitudinally extending rail portions (e.g., extend from the cab front section 622 toward a middle section). The cab rail portions 630, 632 may define a centerline of the cab 40, which may (run parallel and) be between the first cab rail portion 630 and the second cab rail portion 632. In some embodiments, centerline of the cab 40 and the centerline of the mount 500 are aligned (e.g., parallel). According to an exemplary embodiment, components of the cab 40 are coupled to the cab rail portions 630, 632, either directly or through another component (e.g., a side plate, a mounting bracket, a cab frame extension, etc.). Further, components of the vehicle 10 (e.g., the rail portions 30, 32) may also be coupled to the cab rail portions 630, 632, either directly or through another component (as discussed below). In some embodiments, the cab rail portions 630, 632 are suitable elongated structural members (e.g., a beam, channel, tubing, extrusion, etc.), and/or have other suitable cross-sectional shapes (e.g., C-shape, H-profile, I-profile, U-profile, L-profile, square, rectangular, etc.). In some embodiments, the cab rail portions 630, 632 include fewer, additional, and/or different components (e.g. sidewalls, support walls, extensions or walls that extend, side plates, etc.).

Figure 17:
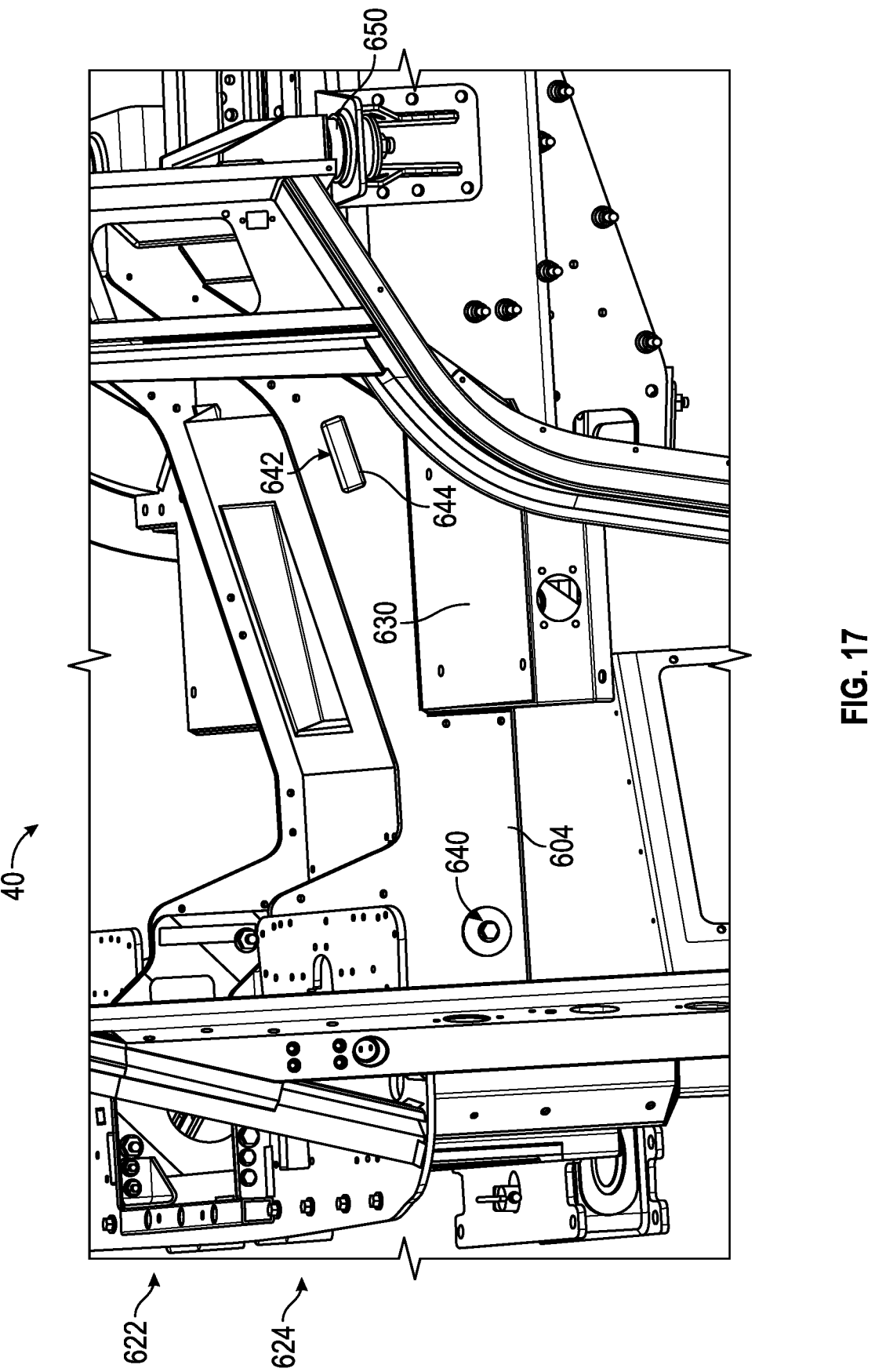
FIG. 17 is a left side cross-sectional view of the vehicle of FIG. 1, according to an exemplary embodiment.

As shown in FIGS. 14 and 17, the cab 40 includes side portions or side members, shown as sidewall 602 (as shown in at least FIG. 14) and sidewall 604 (as shown in at least FIG. 17). The sidewalls 602, 604 may be coupled with the cab rail portions 630, 632. The sidewalls 602, 604 may extend from the cab rail portions 630, 632 in a direction parallel to, or substantially parallel to, the cab rail portions 630, 632. The sidewalls 602, 604 may be longitudinally extending portions, and may define a centerline of the cab 40, which may (run parallel and) be between the sidewall 602 and the sidewall 604.

As shown in FIGS. 14 and 17, the cab 40 also includes one or more extending portions, rails, or members, shown as cab cross-member 640. In an exemplary embodiment, the cab cross-member 640 is a laterally extending cross-member. For example, the cab cross-member 640 may couple with the cab rail portions 630, 632, and extend there between. In some embodiments, the cab cross-member 640 couples with the sidewalls 602, 604, and extends there between. According to an exemplary embodiment, the cab cross-member 640 is configured to support components of the cab 40 and/or engage components of the vehicle 10 (e.g., the mount 500, the receiver 520, etc.), as discussed below. In an exemplary embodiment, the cab cross-member 640 is a hollow elongated structural member (e.g., a tube, etc.). The cab cross-member 640 may couple with the cab rail portions 630, 632 via a plurality of bolts. In some embodiments, the cab cross-member 640 is coupled to the cab rail portions 630, 632 via another suitable configuration (e.g., welded, machined/fabricated as a component of the cab frame 624, etc.). As shown in FIGS. 14 and 17, the cab cross-member 640 is positioned at a forward portion of the cab 40 (e.g., the cab rail portions 630, 632, the sidewalls 602, 604, etc.). In an exemplary embodiment, the cab cross-member 640 is positioned at a forward portion of the mount 500, for example at a forward position relative to the receiver 520.

In some embodiments, the cab 40 includes a plurality of cab cross-members 640. For example, the cab 40 may include a first cab cross-member 640 at a forward portion of the cab 40, and a second cab cross-member 640 at a middle or rear portion of the cab 40. In other embodiments, the cab cross-member 640 is another suitable elongated structural member (e.g., a beam, channel, tubing, extrusion, etc.) of any suitable cross-sectional shape (e.g., C-shape, H-profile, I-profile, U-profile, L-profile, square, rectangular, etc. having a top section, a base section, a bottom section, etc.). In yet other embodiments, the cab cross-member 640 is not an elongated structural member; rather, the cab cross-member 640 is another suitable receiver or engagement member coupled to the cab 40 (e.g., a hook, a loop, a block, a cheek plate, a machined slab, a machined cube, a peg, etc.).

Referring still to FIGS. 14 and 17, the cab 40 is shown to include an engagement or support member, shown as brace 642. In an exemplary embodiment, the brace 642 is coupled with a component of the cab frame 624 (e.g., the cab rail portion 630, the cab rail portion 632), and extends from the cab frame 624 (e.g., laterally). In other embodiments, the brace 642 is coupled with other components of the cab 40 (e.g., sidewall 602, sidewall 604, etc.). As will be discussed in greater detail below, in an exemplary embodiment the brace 642 is configured to engage (e.g., contact, couple, etc.) a component of the mount 500 (e.g., the second connecting panel 532, etc.), for example in response to movement of the cab 40. According to an exemplary embodiment, the brace 642 is a block having an engagement surface 644, for example to engage a component of the mount 500 (e.g., the second connecting panel 532). As shown in FIGS. 14 and 17, the brace 642 (e.g., the engagement surface 644) may be angled relative to a plane of the cab 40 (e.g., cab rail portions 630, 632, sidewalls 602, 604). For example, the brace 642 (e.g., the engagement surface 644) may be angled relative to the centerline (e.g., center plane) of the cab 40. The brace 642 (e.g., the engagement surface 644) may also be angled or oriented relative to a plane of a component of the mount 500, for example a plane of the second connecting panel 532 or the cab support panel 510. Further, the brace 642 may also be positioned at a rear portion of the cab 40 (e.g., the cab rail portions 630, 632, sidewalls 602, 604, etc.). In an exemplary embodiment, the brace 642 is positioned at a forward portion of the mount 500, for example at a forward position relative to the cab support panel 510 (as shown in at least FIG. 14).

In some embodiments, the cab 40 includes a plurality of braces 642. For example, the cab 40 may include a first brace 642 coupled with and extending from the first cab rail portion 630, and a second brace 642 coupled with an extending from the second cab rail portion 632. In some embodiments, the first brace 642 is coupled with the sidewall 602, and the second brace 642 is coupled with the sidewall 604. The plurality of braces 642 may be coupled to the cab 40 (e.g., the cab rail portions 630, 632, the sidewalls 602, 604, etc.) and substantially aligned (e.g., laterally aligned). In other embodiments, the plurality of braces 642 are in another suitable configuration (e.g., angled, offset, on the same cab rail portion 630, 632, on the same sidewall 602, 604, or otherwise configured relative to one another). In some embodiments, the brace 642 is not a block. Rather, the brace 642 may be another suitable engagement member coupled to the cab 40 (e.g., a hook, a loop, a cheek plate, a machined slab, a machined cube, a peg, etc.). In other embodiments, the brace 642 is an elongated structural member (e.g., a beam, channel, tubing, extrusion, etc.) of any suitable cross-sectional shape (e.g., C-shape, H-profile, I-profile, U-profile, L-profile, square, rectangular, etc. having a top section, a base section, a bottom section, etc.).

According to an exemplary embodiment, the cab 40 is movably coupled to one or more components of the vehicle 10, and is configured to move (e.g., tilt backward, tilt upward, shift rearward, etc.). For example, the cab 40 may be movably coupled to the frame or front rail portions 30, 32 (as shown in at least FIG. 14). The cab 40 may also be movably coupled to the mount 500 (as shown in at least FIG. 14). In an exemplary embodiment, the cab 40 is configured to move relative to the frame (e.g., front rail portions 30, 32) and/or the mount 500 (e.g., tilt backward, tilt upward, shift rearward, etc.).

As shown in FIGS. 14-17, the front section 22 includes one or more stabilizers, shown as isolator 650 (e.g., a resilient member, a dampening member, a rubber member, a bushing, a compressible member). In an exemplary embodiment, the front section 22 (e.g., front rail portions 30, 32, the mount 500) is coupled with the cab 40 (e.g., cab rail portions 630, 632) via a plurality of isolators 650 (e.g., four isolators). The isolator 650 may be configured to dampen forces introduced to the vehicle 10 (e.g., the cab 40), and/or stabilize the cab 40. For example, the isolator 650 may include an aperture configured to receive a fastener, and the fastener may be used to facilitate coupling the front section 22 (e.g., front rail portions 30, 32) and/or the mount 500 to the cab 40 (e.g., cab rail portions 630, 632). The fastener may also be configured to compress the isolator 650 to rigidly hold the isolator 650. The isolator 650 may further include one or more portions, for example an upper stabilizer portion and a lower stabilizer portion. In some embodiments, the isolator 650 is comprised of a single component. In an exemplary embodiment, the isolator 650 is configured to interface (e.g., couple, contact, engage, etc.) one or more mounting tabs, for example to mount the front section 22 (e.g., front rail portions 30, 32) to the cab 40 (e.g., cab rail portions 630, 632).

As shown in FIGS. 14-15, the front section 22 includes a plurality of isolators 650 (e.g., four isolators). In an exemplary embodiment, a pair of isolators 650 are coupled with the mount 500. For example, a pair of isolators 650 can be coupled with the top support panel 508 (e.g., at a forward portion of the mount 500). The isolators 650 may further be coupled with a portion of the cab 40, for example to support a front portion of the cab 40. The front section 22 is also shown to include a pair of isolators 650 extending from a component of the front section 22 (e.g., extending from the front rail portions 30, 32). For example, the front section 22 may include a pair of isolators 650 extending from a portion of the front rail portions 30, 32 at the cab support panel 510. The pair of isolators 650 may extend from the front rail portions 30, 32 via mounting tabs or mounting brackets. The pair of isolators 650 may also be configured to couple a portion of the cab 40, for example to support a rear or body portion of the cab 40. As shown in FIGS. 14-15, the pair of isolators 650 coupled with the mount 500 (e.g., the top support panel 508) may be positioned or oriented a distance below or lower than the pair of isolators 650 coupled with the front rail portions 30, 32. In some embodiments, the front section 22 and/or the mount 500 includes fewer or additional isolators 650, which may be otherwise positioned at the front section 22 (e.g., the front rail portions 30, 32) and/or the mount 500 (e.g., the support panel 522, the cab support panel 510, the sidewalls 502, 504, etc.). In other embodiments, the isolator 650 (or plurality of isolators 650) include additional, fewer, or different working components (e.g., a boss, a bracket, a side plate, a top plate, bracings, isolators, a pivot pin, a retaining pin, fasteners, etc.) that facilitate coupling the cab 40 to the frame (e.g., front rail portions 30, 32) and/or the mount 500.

As shown in FIG. 14, with the cab 40 coupled with the frame (e.g., front rail portions 30, 32) and mount 500, the cab cross-member 640 is coupled at a front portion of the cab 40 and positioned forward relative to components of the mount 500 (e.g., the receiver 520, the receiving panel 524). In an exemplary embodiment, the cab cross-member 640 is positioned a distance forward relative to the receiver 520 (e.g., the receiving panel 524). For example, the cab cross-member 640 may be positioned 0.25, 0.5, 1, 1.25, 1.5, 2, 2.5, 5 inches, or any other suitable distance, forward relative to the receiver 520. In some embodiments, the cab cross-member 640 is in contact with (e.g., 0 inches from) the receiver 520. In other embodiments, the cab cross-member 640 is configured not to extend beyond a threshold distance forward (e.g., 2, 2.5, 5, 10, etc. inches) relative to the receiver 520.

As also shown in FIG. 14, with the cab 40 coupled with the frame (e.g., front rail portions 30, 32) and mount 500, the brace 642 is coupled at a middle (or rear) portion of the cab 40 and is positioned at components of the mount 500 (e.g., the second connecting panel 532). In an exemplary embodiment, the brace 642 is positioned a distance away from the second connecting panel 532. For example, the brace 642 may be positioned 0.25, 0.5, 1, 1.25, 1.5, 2, 2.5, 5 inches, or any other suitable distance, from the second connecting panel 532. In some embodiments, the brace 642 is in contact with (e.g., 0 inches from) the second connecting panel 532. In other embodiments, the brace 642 is configured not to extend beyond a threshold distance from (e.g., 2, 2.5, 5, 10 etc. inches) relative to the second connecting panel 532. As shown in FIG. 14, the engagement surface 644 of the brace 642 is angled relative to one or more components of the mount 500 (e.g., the second connecting panel 532). In an exemplary embodiment, the brace 642 (e.g., the engagement surface 644) is parallel, or substantially parallel, to a surface or face of the second connecting panel 532. In some embodiments, the brace 642 (e.g., the engagement surface 644) is otherwise aligned with, or relative to, a surface or face of the second connecting panel 532 (e.g., at a 5, 10, 15, 20, etc. degree angle).

According to an exemplary embodiment, a vehicle with an impact-mitigating cab may be prepared using the components described in FIGS. 1-17. As discussed above, in an exemplary embodiment the vehicle 10 includes a front section 22 having a frame (e.g., front rail portions 30, 32) and a cab 40 (e.g., having cab rail portions 630, 632). The vehicle 10 may also include a mount 500 coupled with the front rail portions 30, 32 and the cab 40. The mount 500 may also include, or be coupled with, a receiver 520 (having a receiving panel 524) positioned between a top support panel 508 and a cab support panel 510, and a connecting panel 532 extending between the receiver 520 and the cab support panel 510. The cab 40 may also include a cab cross-member 640 extending between the cab rail portions 630, 632 (and/or sidewalls 602, 604), and a brace 642 coupled with the cab 40 (e.g., a cab rail portion 630, 632, a sidewall 602, 604, etc.).

According to an exemplary embodiment, the front section 22 is formed by coupling the front rail portions 30, 32 and/or the mount 500 to the cab 40 (e.g., the cab rail portions 630, 632), for example via one or more isolators 650 (e.g., four isolators). With the front rail portions 30, 32 and the mount 500 coupled with the cab 40, the cab 40 may be positioned at a forward portion of the frame (e.g., at the front rail portions 30, 32). In an exemplary embodiment, the cab cross-member 640 is coupled at a front portion of the cab 40, and is positioned a distance forward relative to one or more components of the mount 500 (e.g., the receiver 520, the receiving panel 524). Further, the brace 642 may be coupled at a middle or rear portion of the cab 40, and may be positioned a distance from one or more components of the mount 500 (e.g., the second connecting panel 532).

In various exemplary embodiments, the vehicle 10 may encounter a force (e.g., an impact, load, accident, etc.) at the cab 40. For example, the cab 40 may encounter a substantially horizontal force at the front of the cab 40 (e.g., above the cab rail portions 630, 632). In other embodiments, the cab 40 encounters a substantially horizontal force at a side of the cab 40, a substantially vertical force down on the top of the cab 40, and/or any other force at another location of the cab 40 (e.g., a front portion, front-middle portion, front-lower portion, near the headlights, near the bumper, etc.). According to an exemplary embodiment, when the cab 40 encounters a force, the cab 40 is configured to reposition or move relative to the frame (e.g., front rail portions 30, 32) and/or the mount 500. For example, the cab 40 may be configured to rotate about a lateral axis (e.g., tilt backward, tilt upward, tilt downward, etc.) and/or shift in one or more directions (e.g., shift rearward, shift sideways, shift down, etc.). In this regard, a force may be initially received by components at the front of the cab 40 (e.g., front bumper, grill, etc.), and may then be transferred to other components at the middle or rear of the cab 40.

According to an exemplary embodiment, the receiver 520 is positioned rearward relative to a front portion of the cab 40, and is configured to receive a force (or a portion thereof) as the cab 40 rotates and/or is repositioned (e.g., shifts rearward, etc.). For example, in response to the cab 40 receiving a force, the cab 40 may be rotated and/or repositioned relative to the mount 500 and/or the frame (e.g., front rail portions 30, 32). As the cab 40 rotates and/or is repositioned, the cab cross-member 640 may move or reposition (e.g., shift rearward, shift downward, etc.). According to an exemplary embodiment, as the cab cross-member 640 moves or is repositioned, the cab cross-member 640 engages (e.g., contacts, couples, hits, etc.) the receiving panel 524 of the receiver 520. The receiving panel 524 may engage (e.g., receive, stop, restrict) the cab cross-member 640 resulting in the force (or a portion thereof) being transferred from the cab 40, through the cab cross-member 640 to the receiving panel 524 (e.g., the receiver 520), and into the mount 500. The mount 500 may further be configured to transfer the force (or a portion thereof) from the mount 500 to the frame of the vehicle 10 (e.g., the front rail portions 30, 32).

According to an exemplary embodiment, the second connecting panel 532 is positioned rearward relative to a front portion of the cab 40, and is configured to receive a force (or a portion thereof) as the cab 40 rotates and/or is repositioned (e.g., shifts rearward, etc.). For example, in response to the cab 40 receiving a force, the cab 40 may be rotated and/or repositioned relative to the mount 500 and/or the frame (e.g., front rail portions 30, 32). As the cab 40 rotates and/or is repositioned, the brace 642 may move or reposition (e.g., shift rearward, shift downward, etc.). According to an exemplary embodiment, as the brace 642 moves or is repositioned, the brace 642 (e.g., an engagement surface) engages (e.g., contacts, couples, hits, etc.) the second connecting panel 532. The second connecting panel 532 may engage (e.g., receive, stop, restrict) the brace 642 resulting in the force (or a portion thereof) being transferred from the cab 40, through the brace 642 to the second connecting panel 532, and into the mount 500. The mount 500 may further be configured to transfer the force (or a portion thereof) from the mount 500 to the frame of the vehicle 10 (e.g., the front rail portions 30, 32).

In some embodiments, the receiver 520 is also configured to facilitate positioning the cab 40 relative to the mount 500 and/or the frame (e.g., front rail portions 30, 32). For example, in response to the cab 40 receiving a force, the cab 40 may be repositioned (e.g., shift rearward) relative to the mount 500 (e.g., relative to the top support panel 508, etc.). As the cab 40 is repositioned, the cab cross-member 640 may move or reposition, and engage (e.g., contacts, couples, hits, etc.) the receiving panel 524 of the receiver 520, as discussed above. The receiving panel 524 may engage (e.g., receive, stop, restrict) the cab cross-member 640, resulting in the cab 40 rotating about a lateral axis (e.g., an axis of the cab cross-member 640). As the cab 40 rotates about the lateral axis (e.g., an axis of the cab cross-member 640), one or more components at a rear portion of the cab 40 may engage (e.g., contact, hit, couple) components of the mount 500 and/or the frame (e.g., the front rail portions 30, 32). For example, as the cab 40 rotates about the lateral axis (e.g., an axis of the cab cross-member 640), the brace 642 may engage the second connecting panel 532, as discussed above.

In other embodiments, additional components of the mount 500 and/or the frame are also configured to receive a force (or a portion thereof) as the cab 40 rotates and/or is repositioned (e.g., shifts rearward, etc.). For example, as the cab 40 rotates and/or is repositioned, a rail portion (e.g., cab rail portion 630, 632) or sidewall (e.g., sidewalls 602, 604) of the cab 40 may engage (e.g., contact, hit, couple) one or more components of the mount 500, for example the support panel 522 of the receiver 520. The support panel 522 may engage (e.g., receive, stop, restrict) the rail portion or sidewall of the cab 40, resulting in the force (or a portion thereof) being transferred from the cab 40, through the rail or sidewall to the support panel 522, and into the mount 500. The mount 500 may further be configured to transfer the force (or a portion thereof) from the mount 500 to the frame of the vehicle (e.g., front rail portions 30, 32).

In this sense, components at the front of the cab 40 may be configured to receive an initial force, and the cab 40 may be configured to move relative to the mount 500 and/or the frame (e.g., rotate, be repositioned, etc.). As the cab 40 moves and/or is repositioned, components of the cab 40 (e.g., the cab cross-member 640, the brace 642) may engage components of the mount 500 (e.g., the receiver 520, the receiving panel 524, the second connecting panel 532). This may result in repositioning or rotating the cab 40 relative to the mount 500, for example resulting in rotation of the cab 40 about a lateral axis (e.g., an axis of the cab cross-member 640). Further, this can also result in components of the mount 500 (e.g., the receiver 520, the receiving panel 524, the second connecting panel 532) engaging components of the cab 40 to receive the force (or a portion thereof). For example, the receiving panel 524 may engage the cab cross-member 640 to receive the force (or a portion thereof), and/or the second connecting panel 532 may engage the brace 642 to receive the force (or a portion thereof). In this regard, the engagement between components of the cab 40 and the mount 500 in response to a force at the cab 40 can create additional shear planes in order to reduce the force on other vehicle components (e.g., reduce rotational forces, moment-load forces, etc. applied to the isolators 650, bolts, brackets, mounts, etc. of the cab 40 and/or the chassis).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle comprising:
a chassis having a frame member, the frame member extending longitudinally along an axis of the chassis;
a front axle assembly coupled to the chassis, the front axle assembly including a front axle and front tractive elements coupled to the front axle;
a rear axle assembly coupled to the chassis, the rear axle assembly including a rear axle and rear tractive elements coupled to the rear axle;
a mount coupled to the frame member and extending from a front portion of the frame member, the mount having a receiver extending laterally along the mount;
a cab movably coupled to the frame member and the mount, wherein the cab includes:
a cab frame member coupled to the frame member, the cab frame member extending longitudinally between a front end of the cab and a rear end of the cab;
a cab cross-member coupled to the cab frame member, the cab cross-member extending laterally from the cab frame member; and
a brace coupled to the cab frame member,
wherein the cab cross-member is coupled to the cab frame member forward relative to the receiver, and
wherein in response to a force being applied to the front end of the cab, the cab is configured to move rearward relative to the mount and the cab cross-member is configured to engage the receiver.

2. The refuse vehicle of claim 1, wherein in response to the force being applied to the front end of the cab, the cab cross-member is configured to engage the receiver to rotate the cab about a lateral axis.

3. The refuse vehicle of claim 2, wherein in response to the cab cross-member engaging the receiver to rotate the cab about the lateral axis, the brace is configured to engage a connecting member of the mount.

4. The refuse vehicle of claim 1, wherein the mount further comprises a connecting panel, wherein the connecting panel extends laterally along the mount.

5. The refuse vehicle of claim 4, wherein the brace is a block including an engagement surface configured to engage the connecting panel, and wherein the engagement surface is parallel to a plane of the connecting panel.

6. The refuse vehicle of claim 1, wherein the receiver includes a support panel and a receiving panel, wherein the support panel is perpendicular to the receiving panel, and wherein the receiving panel is configured to receive the cab cross-member.

7. The refuse vehicle of claim 1, further comprising a first isolator and a second isolator, wherein the cab frame member is coupled to the frame member via the first isolator, and the cab frame member is coupled to the mount via the second isolator.

8. A refuse vehicle comprising:

a chassis having a frame member, the frame member extending longitudinally along an axis of the chassis;

a front axle assembly coupled to the chassis, the front axle assembly including a front axle and front tractive elements coupled to the front axle;

a rear axle assembly coupled to the chassis, the rear axle assembly including a rear axle and rear tractive elements coupled to the rear axle;

a mount coupled to the frame member and extending from a front portion of the frame member, the mount having a receiver extending laterally along the mount;

a cab movably coupled to the frame member and the mount, wherein the cab includes:

a cab frame member coupled to the frame member, the cab frame member extending longitudinally between a front end of the cab and a rear end of the cab;

a cab cross-member coupled to the cab frame member, the cab cross-member extending laterally from the cab frame member; and a brace coupled to the cab frame member, wherein in a first position the cab cross-member and the receiver are separated longitudinally by a first distance, and in a second position the cab cross-member and the receiver are separated longitudinally by a second distance, the second position responsive to a force being applied to the front end of the cab.

9. The refuse vehicle of claim 8, wherein in the first position the cab cross-member is positioned forward relative to the receiver by the first distance.

10. The refuse vehicle of claim 9, wherein in the second position the cab cross-member is positioned forward relative to the receiver and the second distance is 0 inches.

11. The refuse vehicle of claim 8, wherein in the first position the brace is positioned a third distance from a connecting panel of the mount.

12. The refuse vehicle of claim 11, wherein in the second position the brace is positioned a fourth distance from the connecting panel of the mount, wherein the fourth distance is 0 inches.

13. The refuse vehicle of claim 8, wherein in response to the force being applied to the front end of the cab, the cab cross-member is configured to engage the receiver to rotate the cab about a lateral axis.

14. The refuse vehicle of claim 8, wherein the mount further comprises a connecting panel, wherein the connecting panel extends laterally along the mount.

15. The refuse vehicle of claim 14, wherein the brace is a block including an engagement surface configured to engage the connecting panel, and wherein the engagement surface is parallel to a plane of the connecting panel.

16. The refuse vehicle of claim 8, further comprising a first isolator and a second isolator, wherein the cab frame member is coupled to the frame member via the first isolator, and the cab frame member is coupled to the mount via the second isolator.

17. A cab assembly, comprising:

a cab body;

a cab frame member extending longitudinally between a front end of the cab body and a rear end of the cab body;

a cab cross-member coupled to the cab frame member, the cab cross-member extending laterally from the cab frame member; and a brace coupled to the cab frame member, wherein in response to a force being applied to the front end of the cab body, the cab body is configured to move rearward and the cab cross-member is configured to engage a receiver.

18. The cab assembly of claim 17, wherein in response to the force being applied to the front end of the cab body, the cab cross-member is configured to engage the receiver to rotate the cab body about a lateral axis.

19. The cab assembly of claim 18, wherein in response to the cab cross-member engaging the receiver to rotate the cab body about the lateral axis, the brace is configured to engage a connecting member.

20. The cab assembly of claim 17, wherein the brace is a block including an engagement surface configured to engage a connecting panel, and wherein the engagement surface is parallel to a plane of the connecting panel.

* * * * *